United States Patent
Srinivasan et al.

(10) Patent No.: US 12,549,963 B2
(45) Date of Patent: Feb. 10, 2026

(54) DYNAMIC PROCESSING TIME AND DYNAMIC BLIND DECODING CAPABILITY FOR NR USER DEVICES

(71) Applicant: Fraunhofer-Gesellschaft zur Foerderung der angewandten Forschung e.V., Munich (DE)

(72) Inventors: Nithin Srinivasan, Berlin (DE); Baris Goektepe, Berlin (DE); Jasmina Mcmenamy, Berlin (DE); Thomas Fehrenbach, Berlin (DE); Thomas Wirth, Berlin (DE); Thomas Schierl, Berlin (DE); Cornelius Hellge, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 489 days.

(21) Appl. No.: 17/881,424

(22) Filed: Aug. 4, 2022

(65) Prior Publication Data
US 2023/0079377 A1    Mar. 16, 2023

Related U.S. Application Data

(63) Continuation of application No. PCT/EP2021/051372, filed on Jan. 21, 2021.

(30) Foreign Application Priority Data

Feb. 7, 2020    (EP) .................................... 20156219

(51) Int. Cl.
H04W 24/02    (2009.01)
H04L 1/00    (2006.01)
H04W 8/24    (2009.01)

(52) U.S. Cl.
CPC ........... *H04W 24/02* (2013.01); *H04L 1/0038* (2013.01); *H04W 8/24* (2013.01)

(58) Field of Classification Search
CPC ........ H04W 24/02; H04W 8/24; H04L 1/0038
See application file for complete search history.

(56) References Cited

U.S. PATENT DOCUMENTS

| | | | |
|---|---|---|---|
| 2016/0150525 A1 | 5/2016 | Xu et al. | |
| 2016/0294531 A1 | 10/2016 | Loehr et al. | |
| (Continued) | | | |

FOREIGN PATENT DOCUMENTS

| | | | |
|---|---|---|---|
| CN | 102067479 A | 5/2011 | |
| CN | 102215577 A | 10/2011 | |
| (Continued) | | | |

OTHER PUBLICATIONS

"Remaining issues on shortened processing time for 1ms TTI" Lisbon, Portugal, Oct. 10-14, 2016 (Year: 2016).*

(Continued)

*Primary Examiner* — Mewale A Ambaye
(74) *Attorney, Agent, or Firm* — Perkins Coie LLP; Michael A. Glenn

(57) ABSTRACT

A user device, UE, for a wireless communication system, is to process a transmission received at the UE (PDSCH or PSSCH) or to be prepared by the UE (PUSCH) within a first processing time. Responsive to one or more criteria, the UE is to switch from the first processing time to a second processing time to be used to process a transmission received at the UE or to be transmitted from the UE.

18 Claims, 13 Drawing Sheets

(56) References Cited

U.S. PATENT DOCUMENTS

| | | | |
|---|---|---|---|
| 2018/0020335 A1 | 1/2018 | Yin et al. | |
| 2019/0289544 A1 | 9/2019 | Yi et al. | |
| 2021/0235258 A1 | 7/2021 | Takeda et al. | |
| 2023/0126370 A1* | 4/2023 | Islam | H04W 28/0257 370/329 |
| 2023/0353460 A1* | 11/2023 | Zhou | G06N 3/0455 |
| 2023/0403110 A1* | 12/2023 | Taherzadeh Boroujeni | H04L 5/0028 |
| 2024/0054002 A1* | 2/2024 | Takazawa | G06F 9/45533 |
| 2024/0275511 A1* | 8/2024 | Yamaura | H04J 3/0638 |

FOREIGN PATENT DOCUMENTS

| | | | | |
|---|---|---|---|---|
| WO | WO-2018085075 A1 * | 5/2018 | | H04L 1/1812 |
| WO | 2020008649 A1 | 1/2020 | | |

OTHER PUBLICATIONS

"Discussion on maximum TA and Processing time", LG Electronics, 3GPP Draft; R1-1707555, May 6, 2017 3rd Generation Partnership Project (3GPP), Mobile Competence Centre; Hangzhou, China, May 2017, 4 pp.

"HARQ/Scheduling for shortened processing time for 1ms TTI", NTT Docomo Inc et al., 3GPP Draft; R1-1610043, Oct. 1, 2016 3rd Generation Partnership Project (3GPP), Mobile Competence Centre; Lisbon, Portugal; Oct. 10, 2016-Oct. 14, 2016, XP051159857, Oct. 2016, 12 pp.

"Processing time requirements", Qualcomm Incorporated, 3GPP Draft; R1-1708629_Processing_Time_Requirements, May 7, 2017 3rd Generation Partnership Project (3GPP), Mobile Competence Centre; Hangzhou, China; May 15, 2017-May 19, 2017, XP051263260, May 2017, 9 pp.

"Remaining issues on shortened processing time for 1ms TTI", LG Electronics, 3GPP Draft; R1-1609211 Remaining issues on shortened processing time for 1ms TTI, Oct. 9, 2016 3rd Generation Partnership Project (3GPP), Mobile Competence Centre; Lisbon, Portugal; Oct. 10, 2016-Oct. 14, 2016, XP051149257, Oct. 2016, 4 pp.

"Technical Specification Group Radio Access Network", 3GPP TS 38.214 V16.0.0 (Dec. 2019), 3rd Generation Partnership Project; NR; Physical layer procedures for data (Release 16), Dec. 2019, 147 pp.

* cited by examiner

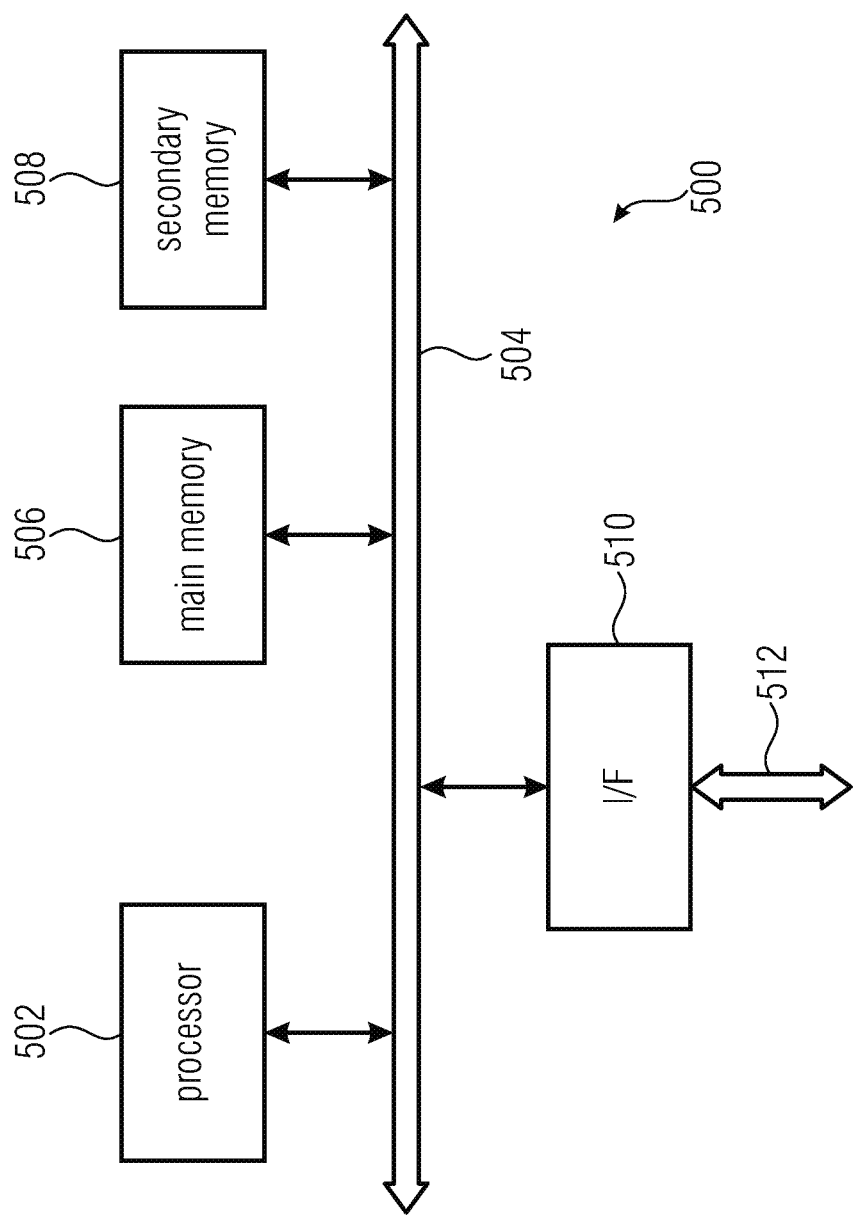

DYNAMIC PROCESSING TIME AND DYNAMIC BLIND DECODING CAPABILITY FOR NR USER DEVICES

CROSS-REFERENCE TO RELATED APPLICATIONS

This application is a continuation of copending International Application No. PCT/EP2021/051372, filed Jan. 21, 2021, which is incorporated herein by reference in its entirety, and additionally claims priority from European Application No. 20156219.6, filed Feb. 7, 2020, which is also incorporated herein by reference in its entirety.

TECHNICAL FIELD

The present application relates to the field of wireless communication systems or networks, more specifically to enhancements or improvements regarding the processing time or the blind decoding capability for NR user devices, UEs. Embodiments of the present invention concern dynamic processing times for NR UEs, like NR Light UEs, or low-complexity devices, or power saving UEs. Further embodiments of the present invention concern a dynamic blind decoding capability for NR UEs, like NR Light UEs, low-complexity devices, or power saving UEs.

BACKGROUND OF THE INVENTION

FIG. 1 is a schematic representation of an example of a terrestrial wireless network 100 including, as is shown in FIG. 1 (a), a core network 102 and one or more radio access networks $RAN_1$, $RAN_2$, . . . . $RAN_N$. FIG. 1 (b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1 (b) shows an exemplary view of five cells, however, the $RAN_n$ may include more or less such cells, and $RAN_n$ may also include only one base station. FIG. 1 (b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows 108$_1$, 108$_2$ and 108$_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 (b) by the arrows pointing to "core". The core network 102 may be connected to one or more external networks. Further, some or all of the respective base station $gNB_1$ to $gNB_5$ may be connected, e.g. via the S1 or X2 interface or the XN interface in NR, with each other via respective backhaul links $116_1$ to $116_5$, which are schematically represented in FIG. 1 (b) by the arrows pointing to "gNBs". A sidelink channel allows direct communication between UEs, also referred to as device-to-device (D2D) communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and one or more of a system information block (SIB), the physical downlink, uplink and sidelink control channels (PDCCH, PUCCH, PSSCH) carrying for example the downlink control information (DCI), the uplink control information (UCI) and the sidelink control information (SCI). Note, the sidelink interface may a support 2-stage SCI. This refers to a first control region containing some parts of the SCI, and optionally, a second control region, which contains a second part of control information.

For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks (NTN) exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

It is noted that the information in the above section is only for enhancing the understanding of the background of the invention and therefore it may contain information that does not form known technology that is already known to a person of ordinary skill in the art.

Starting from the known technology as described above, there may be a need for enhancements or improvements regarding the processing times for NR user devices, UEs.

SUMMARY

An embodiment may have a user device, UE, for a wireless communication system, wherein the UE is to process a transmission received at the UE (PDSCH or PSSCH) or to be prepared by the UE (PUSCH) within a first processing time, and wherein, responsive to one or more criteria, the UE is to switch from the first processing time to a second processing time to be used to process a transmission received at the UE or to be transmitted from the UE.

Another embodiment may have a base station for a wireless communication system, wherein the base station is to serve a UE of the wireless communication system, the UE capable to switch from a first processing time to a second processing time to be used to process a transmission received at the UE or to be transmitted from the UE, and wherein the base station is to send to the UE a signaling that causes the UE to activate the processing time switching, e.g., an RRC or MAC CE a DCI, or a combination thereof.

Another embodiment may have a user device, UE, for a wireless communication system, wherein the UE is to perform blind decoding to find control data, like PDCCH or PDSCH data or candidates, and wherein the UE is to determine
 a number of maximum blind decodings the UE is capable to perform within a minimum time, or
 a set of search spaces to be monitored by the UE
dependent on a minimum time between a control message, like a downlink control indicator, DCI, or a sidelink control indicator, SCI, and a corresponding data channel, like the Physical Downlink Shared Channel, PDSCH, or the Physical Uplink Shared Channel, PUSCH, or the Physical Sidelink Shared Channel, PSSCH.

Another embodiment may have a base station for a wireless communication system, wherein the base station is to serve a UE of the wireless communication system, the UE capable to determine a number of maximum blind decodings the UE is capable to perform within a minimum time or a set of search spaces to be monitored by the UE dependent on a minimum time between a control message, like a downlink control indicator, DCI, or a sidelink control indicator, SCI, and a corresponding data channel, like the Physical Downlink Shared Channel, PDSCH, or the Physical Uplink Shared Channel, PUSCH, or the Physical Sidelink Shared Channel, PSSCH, and wherein the base station is to select a minimum time and to send a control message, like DCI or SCI, to the UE that includes the minimum time.

Still another embodiment may have a wireless communication system, having one or more inventive user devices, UEs, as mentioned above and/or one or more inventive base stations as mentioned above.

According to another embodiment, a method for operating a wireless communication system, the wireless communication system having one or more user devices, UEs, may have the steps of: processing, by a UE, a transmission received at the UE (PDSCH or PSSCH) or to be prepared by the UE (PUSCH) within a first processing time, and responsive to one or more criteria, switching, by the UE, from the first processing time to a second processing time to be used to process a transmission received at the UE or to be transmitted from the UE.

According to another embodiment, a method for operating a wireless communication system, the wireless communication system having one or more user devices, UEs, and one or more base stations, may have the steps of: serving, by a base station, a UE being capable to switch from a first processing time to a second processing time to be used to process a transmission received at the UE or to be transmitted from the UE, and sending to the UE, by the base station, a signaling that causes the UE to activate the processing time switching, e.g., an RRC or MAC CE a DCI, or a combination thereof.

According to another embodiment, a method for operating a wireless communication system, the wireless communication system having one or more user devices, UEs, may have the steps of: performing, by a UE, blind decodings to find control data, like PDCCH or PDSCH data or candidates, and dependent on a minimum time between a control message, like a downlink control indicator, DCI, or a sidelink control indicator, SCI, and a corresponding data channel, like the Physical Downlink Shared Channel, PDSCH, or the Physical Uplink Shared Channel, PUSCH, or the Physical Sidelink Shared Channel, PSSCH, determining, by the UE,
 a number of maximum blind decodings the UE is capable to perform within a minimum time, or
 a set of search spaces to be monitored by the UE.

According to another embodiment, a method for operating a wireless communication system, the wireless communication system having one or more user devices, UEs, and one or more base stations, may have the steps of: serving, by a base station, a UE being capable to determine a number of maximum blind decodings the UE is capable to perform within a minimum time or a set of search spaces to be monitored by the UE dependent on a minimum time between a control message, like a downlink control indicator, DCI, or a sidelink control indicator, SCI, and a corresponding data channel, like the Physical Downlink Shared Channel, PDSCH, or the Physical Uplink Shared Channel, PUSCH, or the Physical Sidelink Shared Channel, PSSCH, and selecting, by the base station, a minimum time and to send a control message, like DCI or SCI, to the UE that includes the minimum time.

Still another embodiment may have a non-transitory digital storage medium having stored thereon a computer program for performing any of the inventive methods as mentioned above, when said computer program is run by a computer.

BRIEF DESCRIPTION OF THE DRAWINGS

Embodiments of the present invention are now described in further detail with reference to the accompanying drawings, in which:

FIG. 13 illustrates an example of a computer system on which units or modules as well as the steps of the methods described in accordance with the inventive approach may execute.

DETAILED DESCRIPTION OF THE INVENTION

Figure 1A:
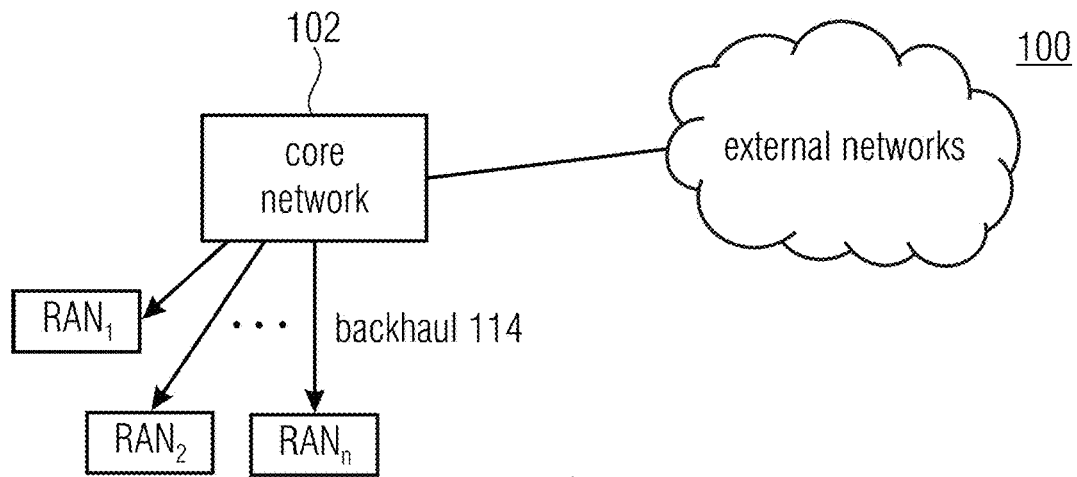
FIG. 1 (a and b) shows a schematic representation of an example of a wireless communication system.

Embodiments of the present invention are now described in more detail with reference to the accompanying drawings in which the same or similar elements have the same reference signs assigned.

Wireless communication systems or networks, like the one described above with reference to FIG. 1 may be implemented in accordance with the new radio, NR, standard, and, conventionally, NR may support two or three different PDSCH processing times including a very stringent processing time introduced for URLLC (ultra-reliable low-latency communication) use cases. The processing time is defined as follows:

$T_{proc} = (N_1 + d_{1,1})(2048 + 144)\kappa(2^{-\mu})T_c$ after the end of the last symbol of the PDSCH, where $\mu = \text{argmax}_{N_1} (\mu_{PDSCH}, \mu_{PDCCH}, \mu_{UL})$.

$\kappa = T_s/T_c = 64$ $T_s$—basic time for LTE, $T_c$—basic time for NR

For example, a first PDSCH processing time capability yields, for the different numerologies, a PDSCH decoding time or PDSCH processing time as indicated in table 1 below:

| μ | PDSCH decoding time $N_1$ [symbols] | |
|---|---|---|
| | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the high layer parameter is not configured |
| 0 | 8 | 13 |
| 1 | 10 | 13 |
| 2 | 17 | 20 |
| 3 | 20 | 24 |

A second PDSCH processing time capability yields, for different numerologies μ, a PDSCH decoding time or PDSCH processing time as indicated in table 2 below.

| μ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

The UE may be capable of one or more processing capabilities. As shown in the tables, each processing capability equals to a different number of OFDM symbols depending on the subcarrier spacing μ.

Currently, in NR, a UE is configured with a single processing time capability only, for example, the first PDSCH processing time capability or the second PDSCH processing time capability described above with reference to table 1 and table 2, respectively. For example, currently, in NR, a UE is configured only with a single PDSCH processing time so as to ensure that a hybrid automatic repeat request, HARQ, feedback is reported in accordance with a HARQ-ACK codebook and such that no mismatch is between the gNB and the UE.

Besides regular UEs, also so-called low-complexity UEs exist, a class of devices that, for example, is more capable than eMTC/NB-IoT devices (eMTC=enhanced machine-type communication, NB-IoT=narrowband internet of things) and that may support different features and a smaller bandwidth than eMBB/URLLC devices (eMBB=enhanced mobile broadband, URLLC=ultra-reliable low-latency communication). For example, low-complexity UEs may occupy 10 or 20 MHz of bandwidth and deliver 100 Mbps (Mbps=megabits per second) of downlink and 50 Mpbs of uplink, thereby making low-complexity UEs usable for certain use cases, such as wearables, industrial IoT devices, and sensor devices. Other use cases may include smart grid devices, logistic tracker devices and healthcare monitor devices.

However, low-complexity UEs may have lesser processing capabilities when compared to other UEs, like an eMBB UE or an URLLC UE. Thus, the processing time capability currently used may not be suitable for such devices, or more generally, for any low complexity UE not having the processing power yielding or allowing for such a processing time capability, or for UEs that need to share their processing capabilities with other processes in the UE. One solution to this drawback may be the use of a more relaxed processing time for low-complexity UEs. However, this leads to higher delays, for example, for the HARQ reporting since the gNB has to assume that the UE needs more time for processing. Further, providing a more relaxed processing time when compared to the currently used single processing time in NR contributes to the latency. For example, when considering the processing capabilities at the UE side, since the UE has to receive and transmit multiple transmissions in a certain time window, and since components may have to be shared among these processes, the processing time needs to accommodate these latencies. When considering a UE, like a low-complexity UE, having less processing capabilities as compared to an eMBB UE, the resulting latency is even higher.

In a wireless communication system or network, like the one described above with reference to FIG. 1, a UE may perform blind decoding, for example, to detect one or more PDCCH candidates in a certain search space. For example, a UE may monitor one or more PDCCH candidates in one or more control resource sets, CORESETs, where monitoring refers to decoding some or all PDCCH candidates according to the monitored DCI format. A set of PDCCH candidates for a UE to monitor may be defined in terms of a PDCCH search space, and the search space may be a common search space, CSS, or a UE specific search space, USS. Considering that the UE is not aware of the detailed control channel structure, the decoding is referred to as blind decoding, BD, and includes a number of decoding attempts on a number of PDCCH candidate locations for a number of defined DCI formats. In a UE, the higher the number of decoding is, the higher the power consumption associated with the blind decoding process is. For example, a powerful blind decoding unit in a UE may be complex and expensive and, when used, consumes a substantial amount of energy. When considering, on the other hand, UEs having a low complexity, for example, a simple processing hardware, like the above-mentioned low-complexity UEs, it may be desired to reduce the blind decoding, BD, effort. Thus, there may be UEs which are not able to support the currently used maximum number of BDs per slot per cell.

One approach is to reduce the maximum number of BDs that the UE needs to support within a time slot, however, from the gNB perspective, this reduces the flexibility to schedule the respective UE. This may be a problem if many UEs have to be scheduled in the same CORESET. Another approach may be to relax the minimum time between a DCI and a corresponding PDSCH/PUSCH. For example, TS 38.214 defines the minimum time in case of a DCI scheduling PUSCH by the parameter K2 min. When further increasing this time, the UE may have more time to decode the DCI as well as to prepare the transmission, the encoding, the modulation, etc. The minimum time, in case of a DCI scheduling PDSCH, is defined by the factor K0min, also referred to as the minimum scheduling offset restriction, which is defined by in TS 38.214.

The minimum scheduling offset restriction, which is indicated in the DCI, indicates a minimum time between the DCI and the PDSCH. The UE ignores a PDSCH which does not match this criterion which allows the UE to have more time to process a DCI and prepare for the PDSCH reception. However, a drawback of increasing the minimum time between a DCI and the corresponding PDSCH/PUSCH is the high latency that is introduced and that there is no flexibility. Furthermore, the UE may have a limited capacity for performing BDs, and there are no procedures implemented so far as to what happens in case the gNB indicates a minimum time, like a smaller K2 min or a K0min, that is smaller than what the UE is able to support.

Figure 1B:
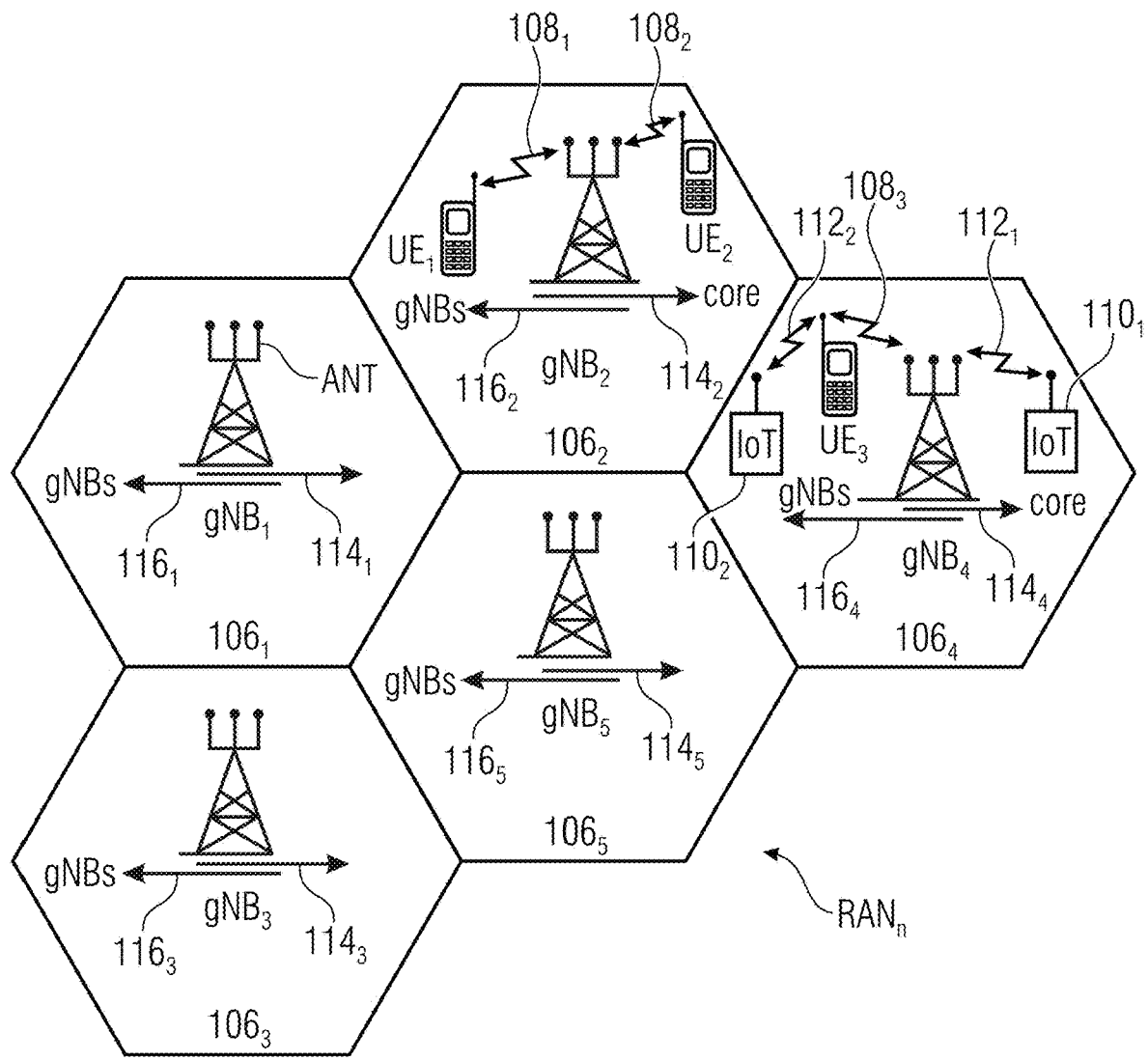
Figure 2:
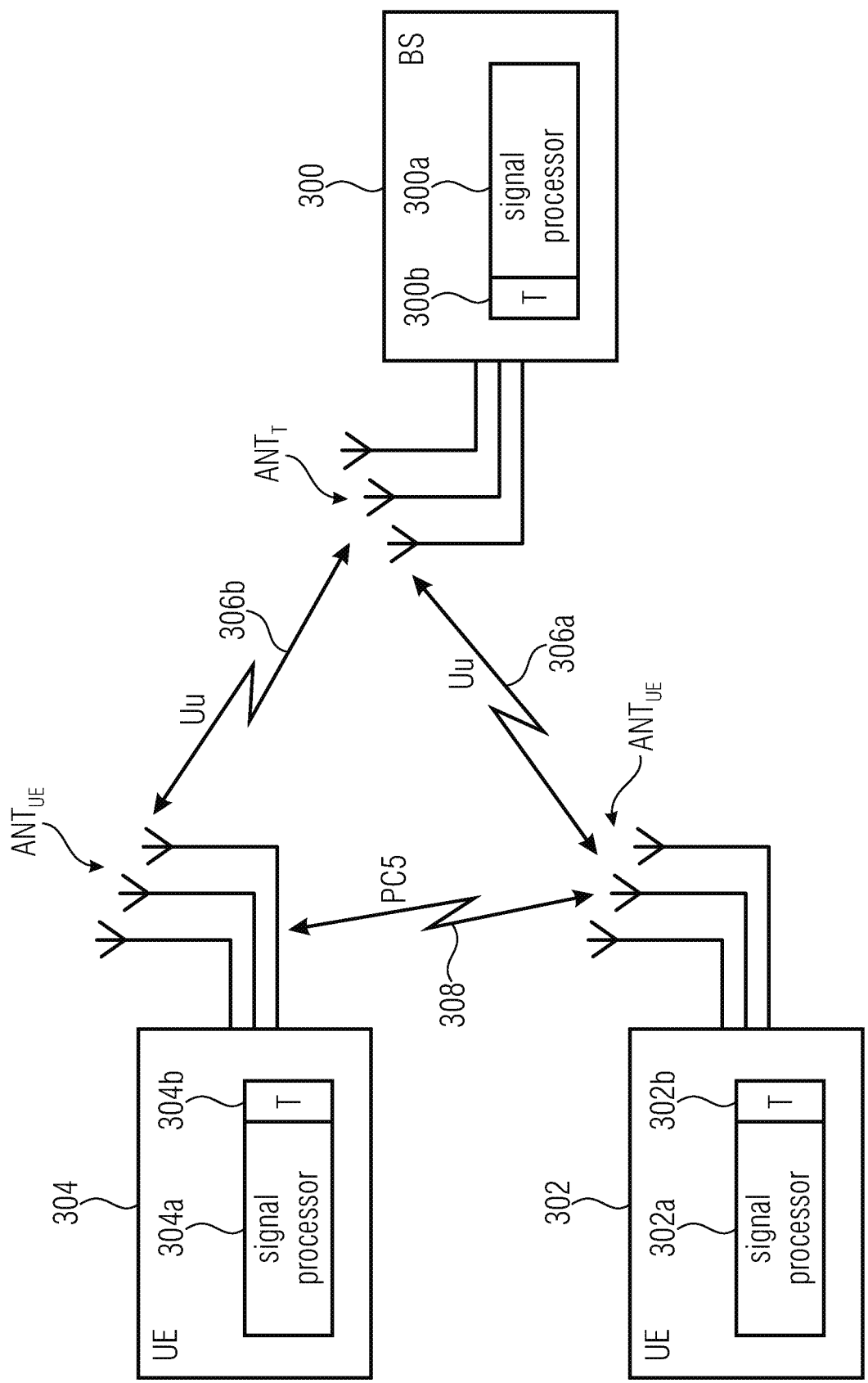
FIG. 2 is a schematic representation of a wireless communication system including a transmitter, like a base station, and one or more receivers, like user devices, UEs capable of operating in accordance with embodiments of the present invention.

Embodiments of the present invention provide improvements and enhancements in a wireless communication system or network addressing the above described problems, namely approaches for providing enhancements concerning the processing times and the blind decoding for NR user devices, UEs, e.g., low-complexity UEs. Embodiments of the present invention may be implemented in a wireless communication system as depicted in FIG. 1 including base stations and users, like mobile terminals or IoT devices. FIG. 2 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5/sidelink (SL) interface. When the UEs are not served by the base station, are not be connected to a base station, for example, they are not in an RRC connected state, or, more generally, when no SL resource allocation configuration or assistance is provided by a base station, the UEs may communicate with each other over the sidelink (SL). The system or network of FIG. 2, the one or more UEs 302, 304 of FIG. 2, and the base station 300 of FIG. 2 may operate in accordance with the inventive teachings described herein.

First Aspect—Dynamic Processing Time Switching

User Device

The present invention provides a user device, UE, for a wireless communication system,
  wherein the UE is to process a transmission received at the UE (PDSCH or PSSCH) or to be prepared by the UE (PUSCH) within a first processing time, and
  wherein, responsive to one or more criteria, the UE is to switch from the first processing time to a second processing time to be used to process a transmission received at the UE or to be transmitted from the UE.

In accordance with embodiments,
  the first processing time has a first duration, e.g., a first number of symbols or a first time period, and the second time has a second duration, e.g., a second number of symbols or a second time period, and
  the first duration is shorter than the second duration, or the first duration is longer than the second duration.

In accordance with embodiments, the one or more criteria comprise one or more of the following:
  a dynamic indication by the base station, e.g. via RRC signaling, DCI or in or MAC control element, CE, or a combination of these signaling procedures,
  a number of transmissions received or to be transmitted in a certain time window before a scheduled transmission, e.g. maximum two PDSCHs or PUSCHs in a previous slot,
  a number of transmissions that the UE supports in a certain time window after a scheduled transmission, e.g. maximum two PDSCHs or PUSCHs in the next slot,
  a number of transmissions the UE supports in a current slot, e.g. maximum two PDSCHs or PUSCHs in the current slot,
  a position of a HARQ feedback for one of a plurality of transmissions in a HARQ-ACK codebook, e.g. a last transmission for which HARQ feedback in a HARQ-ACK codebook is to be reported,
  a size of a current transmission and/or a previous transmission and/or a following transmission, e.g. the Transport Block Size, TBS, the Bandwidth in PRBs, the duration of the transmission, e.g., a Slot Aggregation Factor, or a number of Code Block Groups, CBGs.

In accordance with embodiments,
  the UE is preconfigured with the one or more criteria and the first and second processing times, and
  the UE is to signal its capability to switch processing times to the wireless communication system, e.g., to a base station when connecting or reconnecting to the wireless communication system.

In accordance with embodiments, the UE is to receive from the wireless communication system, e.g., from the base station, a signaling that indicates which of the preconfigured criteria and/or processing times are to be used by the UE.

In accordance with embodiments,
  the UE is to signal its capability to switch processing times to the wireless communication system, e.g., to a base station when connecting or reconnecting to the wireless communication system, and
  the UE is to receive from the wireless communication system, e.g., from the base station, a configuration including the one or more criteria and/or the first and second processing times.

In accordance with embodiments, the first processing time has a first duration, e.g., a first number of symbols or a first time period, and is a default processing time, and the UE is not to be configured with a second processing time having a second duration, e.g., a second number of symbols or a second time period, that is longer than the first duration.

In accordance with embodiments, the UE is to activate the processing time switching responsive to a signaling, e.g., an RRC or MAC CE or a DCI, from the wireless communication system, e.g., from the base station.

In accordance with embodiments, after switching to the second processing time, the UE is to stop using the second processing time by switching back to the first processing time, e.g. to a default processing time, responsive to
  the one or more criteria being no longer met, or
  a signaling from the wireless communication system, like an RRC or a DCI from the base station, or
  expiry of a certain time period.

In accordance with embodiments, the UE includes a switch-back timer, and wherein the UE is to start the switch-back timer when switching to the second processing time and to return to the first processing time after the switch-back timer expired.

In accordance with embodiments,
  in case the one or more criteria are not known at a higher layer, like the MAC layer, the higher layer of the UE is to receive from the PHY layer of the UE an indication of the second processing time and to process a packet received from the PHY layer of the UE in accordance with the indicated second processing time, or
  in case the one or more criteria are known at the higher layer, the higher layer of the UE is to determine whether the one or more criteria are met, and to process a packet received from the PHY layer of the UE in accordance with the second processing time when the one or more criteria are met.

In accordance with embodiments, dependent on the one or more criteria, the UE is to select the second processing time from a plurality of processing times the UE is capable to use.

In accordance with embodiments, the UE is a low-complexity device, e.g., a NR light UE like a wearable, a smart grid device, a logistic tracker, a healthcare monitoring device, an industrial camera and/or sensor.

Base Station

The present invention provides a base station for a wireless communication system,
  wherein the base station is to serve a UE of the wireless communication system, the UE capable to switch from a first processing time to a second processing time to be used to process a transmission received at the UE or to be transmitted from the UE, and
  wherein the base station is to send to the UE a signaling that causes the UE to activate the processing time switching, e.g., an RRC or MAC CE a DCI, or a combination thereof.

In accordance with embodiments, the base station is to receive from the UE, e.g., when the connects or reconnects to the wireless communication system, a signaling of its capability to switch processing times.

In accordance with embodiments, in case the UE is preconfigured with one or more criteria for switching transmission times and/or transmission times, the base station is to send to the UE a signaling that indicates which of the preconfigured criteria and/or processing times are to be used by the UE.

In accordance with embodiments, responsive to receiving from the UE a signaling of its capability to switch processing times, the base station is to configure the UE with one or more criteria for switching processing times and/or processing times.

Method

The present invention provides a method for operating a wireless communication system, the wireless communication system comprising one or more user devices, UEs, the method comprising:
  processing, by a UE, a transmission received at the UE (PDSCH or PSSCH) or to be prepared by the UE (PUSCH) within a first processing time, and
  responsive to one or more criteria, switching, by the UE, from the first processing time to a second processing time to be used to process a transmission received at the UE or to be transmitted from the UE.

The present invention provides a method for operating a wireless communication system, the wireless communication system comprising one or more user devices, UEs, and one or more base stations, the method comprising:
  serving, by a base station, a UE being capable to switch from a first processing time to a second processing time to be used to process a transmission received at the UE or to be transmitted from the UE, and
  sending to the UE, by the base station, a signaling that causes the UE to activate the processing time switching, e.g., an RRC or MAC CE a DCI, or a combination thereof.

Second Aspect—Dynamic Blind Decoding Capability

User Device

The present invention provides a user device, UE, for a wireless communication system, wherein the UE is to perform blind decoding to find control data, like PDCCH or PDSCH data or candidates, and
  wherein the UE is to determine
    a number of maximum blind decodings the UE is capable to perform within a minimum time (k0 min or k2 min), or
    a set of search spaces to be monitored by the UE
  dependent on a minimum time (k0min, K2 min) between a control message, like a downlink control indicator, DCI, or a sidelink control indicator, SCI, and a corresponding data channel, like the Physical Downlink Shared Channel, PDSCH, or the Physical Uplink Shared Channel, PUSCH, or the Physical Sidelink Shared Channel, PSSCH.

In accordance with embodiments,
  the UE is preconfigured with a mapping between the minimum time and the number of maximum blind decodings or the set of search spaces, and/or
  the UE is to receive from the wireless communication system a configuration indicating a mapping between the minimum time and the number of maximum blind decodings or the set of search spaces.

In accordance with embodiments,
  the control message, like DCI, SCI, MAC CE, or RRC, includes the minimum time (k0 min, k2 min), and
  responsive to receiving the control message, the UE is to
  perform a number of blind decodings in one or more search spaces which is smaller or equal to the number of maximum blind decodings, or
  monitor the determined set of search spaces.

In accordance with embodiments, the UE is to determine
  a first number of maximum blind decodings or search spaces responsive to receiving a control message indicating a first value of the minimum time, and
  a second number of maximum blind decodings or search spaces responsive to receiving a control message indicating a second value of minimum time,
  wherein the first number and the first value of the minimum time are higher than the second number and the second value of the minimum time.

In accordance with embodiments, the UE is to receive, e.g., using an RRC signaling in response to signaling the UE capability to the wireless communication system,
  a search space configuration, the search space configuration indicating for different values for the minimum time the certain search space to perform the blind decodings, or
  a plurality of search space configurations, the plurality of search space configurations indicating for different values for the minimum time the set of search spaces to be monitored by the UE.

In accordance with embodiments, the search space configuration indicates
  a first search space in case the minimum time is at or below a certain threshold and to perform the bind decodings in the first search space, and
  a second search space in case the minimum time is above the certain threshold and to perform the bind decodings in the first and second search spaces.

In accordance with embodiments, responsive to receiving the control message and setting the number of maximum blind decodings according to the minimum time signaled in the control message, the UE is to apply the determined number of maximum blind decodings or the determined set of search spaces after a certain application delay.

In accordance with embodiments, the UE is a low-complexity device, e.g., a NR light UE like a wearable, a smart grid device, a logistic tracker, a healthcare monitoring device, an industrial camera and/or sensor.

Base Station

The present invention provides a base station for a wireless communication system,
  wherein the base station is to serve a UE of the wireless communication system, the UE capable to determine a number of maximum blind decodings the UE is capable to perform within a minimum time (k0min or k2 min) or a set of search spaces to be monitored by the UE dependent on a minimum time (k0min, K2 min) between a control message, like a downlink control indicator, DCI, or a sidelink control indicator, SCI, and a corresponding data channel, like the Physical Downlink Shared Channel, PDSCH, or the Physical Uplink Shared Channel, PUSCH, or the Physical Sidelink Shared Channel, PSSCH, and
  wherein the base station is to select a minimum time and to send a control message, like DCI or SCI, to the UE that includes the minimum time (k0 min, k2 min).

In accordance with embodiments, the base station is to select the minimum time based on the delay budget of a traffic or a number of users which have to be scheduled in a same CORESET or power saving for the UE.

Method

The present invention provides a method for operating a wireless communication system, the wireless communication system comprising one or more user devices, UEs, the method comprising:

performing, by a UE, blind decodings to find control data, like PDCCH or PDSCH data or candidates, and dependent on a minimum time (k0min, K2 min) between a control message, like a downlink control indicator, DCI, or a sidelink control indicator, SCI, and a corresponding data channel, like the Physical Downlink Shared Channel, PDSCH, or the Physical Uplink Shared Channel, PUSCH, or the Physical Sidelink Shared Channel, PSSCH, determining, by the UE, a number of maximum blind decodings the UE is capable to perform within a minimum time (k0min or k2 min), or a set of search spaces to be monitored by the UE.

The present invention provides a method for operating a wireless communication system, the wireless communication system comprising one or more user devices, UEs, and one or more base stations, the method comprising:

serving, by a base station, a UE being capable to determine a number of maximum blind decodings the UE is capable to perform within a minimum time (k0 min or k2 min) or a set of search spaces to be monitored by the UE dependent on a minimum time (k0 min, K2 min) between a control message, like a downlink control indicator, DCI, or a sidelink control indicator, SCI, and a corresponding data channel, like the Physical Downlink Shared Channel, PDSCH, or the Physical Uplink Shared Channel, PUSCH, or the Physical Sidelink Shared Channel, PSSCH, and selecting, by the base station, a minimum time and to send a control message, like DCI or SCI, to the UE that includes the minimum time (k0min, k2 min).

System

The present invention provides a wireless communication system, comprising an inventive user device, UE, and/or an inventive base station, BS.

Computer Program Product

Embodiments of the present invention provide a computer program product comprising instructions which, when the program is executed by a computer, causes the computer to carry out one or more methods in accordance with the present invention.

First Aspect—Dynamic Processing Time Switching

Embodiments of the first aspect of the present invention are now described in more detail, namely embodiments concerning a dynamic processing time switching in a user device, UE, of a wireless communication system or network. The following embodiments are described with reference to the dynamic switching for the PDSCH processing time, however, the approaches described below may also be applied for the PUSCH preparation time, which is defined in TS 38.214.

Figure 3:
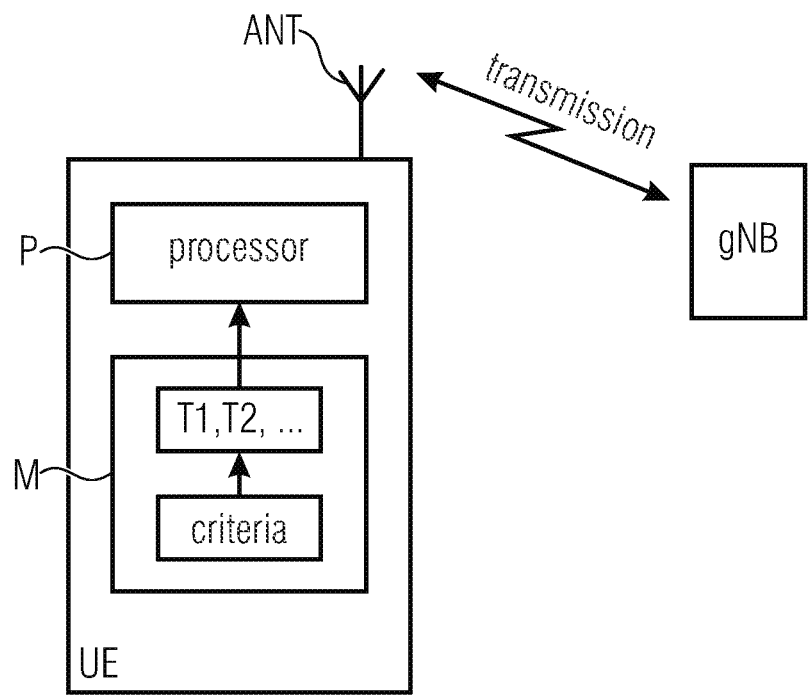
FIG. 3 schematically illustrates a user device, UE, in accordance with embodiments of the first aspect of the present invention.

FIG. 3 schematically illustrates a user device, UE, in accordance with embodiments of the first aspect of the present invention. The UE comprises an antenna ANT for receiving from a source a transmission or for transmitting a transmission towards a target, like a gNB. The UE may process a transmission received at the UE or to be prepared by the UE within a first transmitting time T1 and, responsive to one or more criteria, the UE may switch from the first processing time T1 to a second processing time T2 to be used to process the transmission received at the UE or to be prepared by the UE. The UE may include a processor P for processing the transmission. A storage M may be provided to store processing times that the UE may employ and among which the UE may switch. Two or more processing times T may be stored in memory M. FIG. 3 illustrates an embodiment in accordance with which a first processing time T1, like a default processing time, and a second processing time T2, which is shorter than the first processing time, is stored in the storage M.

Figure 4:
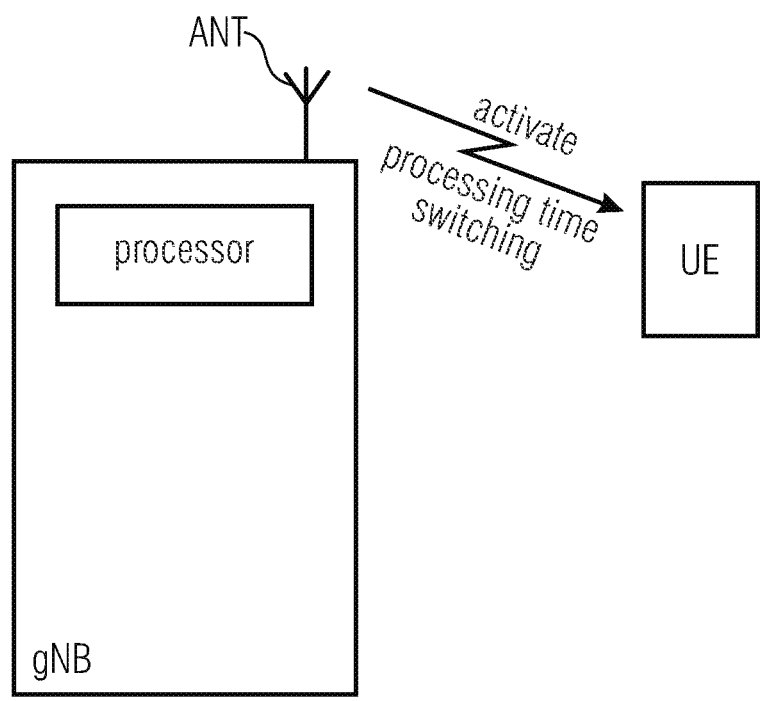
FIG. 4 schematically illustrates a base station, like a gNB, in accordance with embodiments of the first aspect of the present invention.

FIG. 4 schematically illustrates a base station, like a gNB, in accordance with embodiments of the first aspect of the present invention that is to serve a UE capable of switching its processing times, for example, a UE as described above with reference to FIG. 3. The gNB, for example, once being informed by the UE about its capability to switch processing times, may activate the processing time switching at the UE by sending a corresponding signaling to the UE, e.g., using RRC or MAC Control Element, MAC CE, or DCI message, or a combination thereof.

When considering user devices, UEs, having different processing capabilities, it has been found that this may have different effects on the PDSCH processing times, and to deal with this issue, in accordance with embodiments of the first aspect, a dynamic switching of processing times is implemented. For example, when considering low-complexity UEs, a first processing time may be employed that is particularly suitable for these devices and the capabilities the devices have. This first processing time may also be referred to as a more relaxed processing time, which is a processing time that is longer than a second processing time that may be used for devices having higher processing capabilities, like higher hardware capabilities, allowing the implementation of shorter processing times. However, as mentioned above, simply implementing a certain UE with a reduced or relaxed processing time may result in the above-described drawbacks, and it has been found by the inventors of the present invention that even low complexity UEs operating in accordance with the just-mentioned first or more relaxed processing time may, in certain situations, be in a position to complete a processing within a shorter processing time, also referred to as a more stringent processing time, for example, within the second processing time used for UEs with a higher processing power.

Based on this finding, in accordance with the first aspect of the present invention, a UE is provided, see e.g., FIG. 3, a capability to switch between two or more processing times, for example, to support, in addition to its first, long processing time, at least one further longer or more stringent processing time. In accordance with the present invention, this switching is performed responsive to one or more criteria or responsive to one or more certain constraints being met. In accordance with embodiments, the criteria or constraints may include a processing load which is already in the pipeline or which the UE may handle on top of the stringent processing time.

Figure 5:
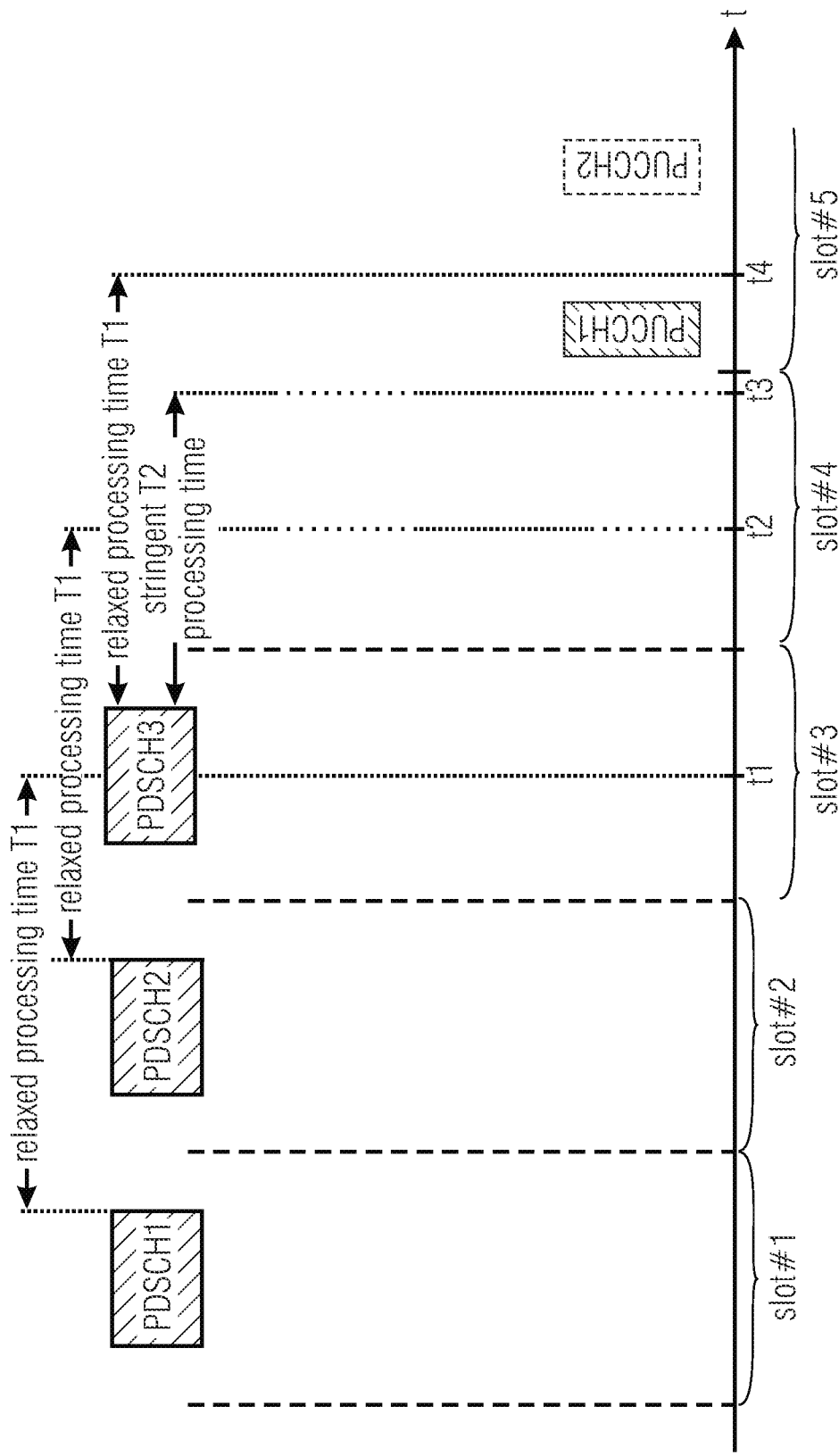
FIG. 5 illustrates an embodiment of a dynamic switching between a first processing time and a second processing time on a downlink.

FIG. 5 illustrates an embodiment of the dynamic switching between a first processing time T1 and a second processing time T2 on a downlink. The UE, like the UE in FIG. 3, may receive respective downlink transmissions as indicated by PDSCH1, PDSCH2 and PDSCH3. The first processing time T1 may be a default processing time of the UE, which is also referred to as the relaxed processing time as it has a duration that is longer than a second processing time T2, which is referred to as the stringent processing time. When employing the first processing time T1, the UE completes processing of the transmission received in PDSCH1 at time t1, the processing of the transmission received at PDSCH2 at time t2, and the processing of the transmission received at PDSCH3 at time t4. The UE monitors whether one or more criteria for processing the downlink transmissions are fulfilled. For example, the UE may determine that it is possible to complete the processing of the transmission in PDSCH3 faster, for example, within the more stringent processing time T2 so that the processing of the transmission received at PDSCH3 may be completed at time t3. This allows the UE to report the feedback of PDSCH3 in an earlier reporting opportunity, like an uplink control message in the PUCCH1 before the time t4. For example, the UE may be configured with an opportunity for an uplink transmission in the PUCCH1 illustrated in FIG. 5 and when the UE determines that it is possible to perform the processing of the transmission in PDSCH3 with the reduced or shorter processing time T2, an uplink transmission may be performed by the UE. Thus, there is more flexibility, and the UE does not have to wait until the longer first processing time T1 is completed and for another PUCCH2, scheduled after the time t4.

Figure 6:
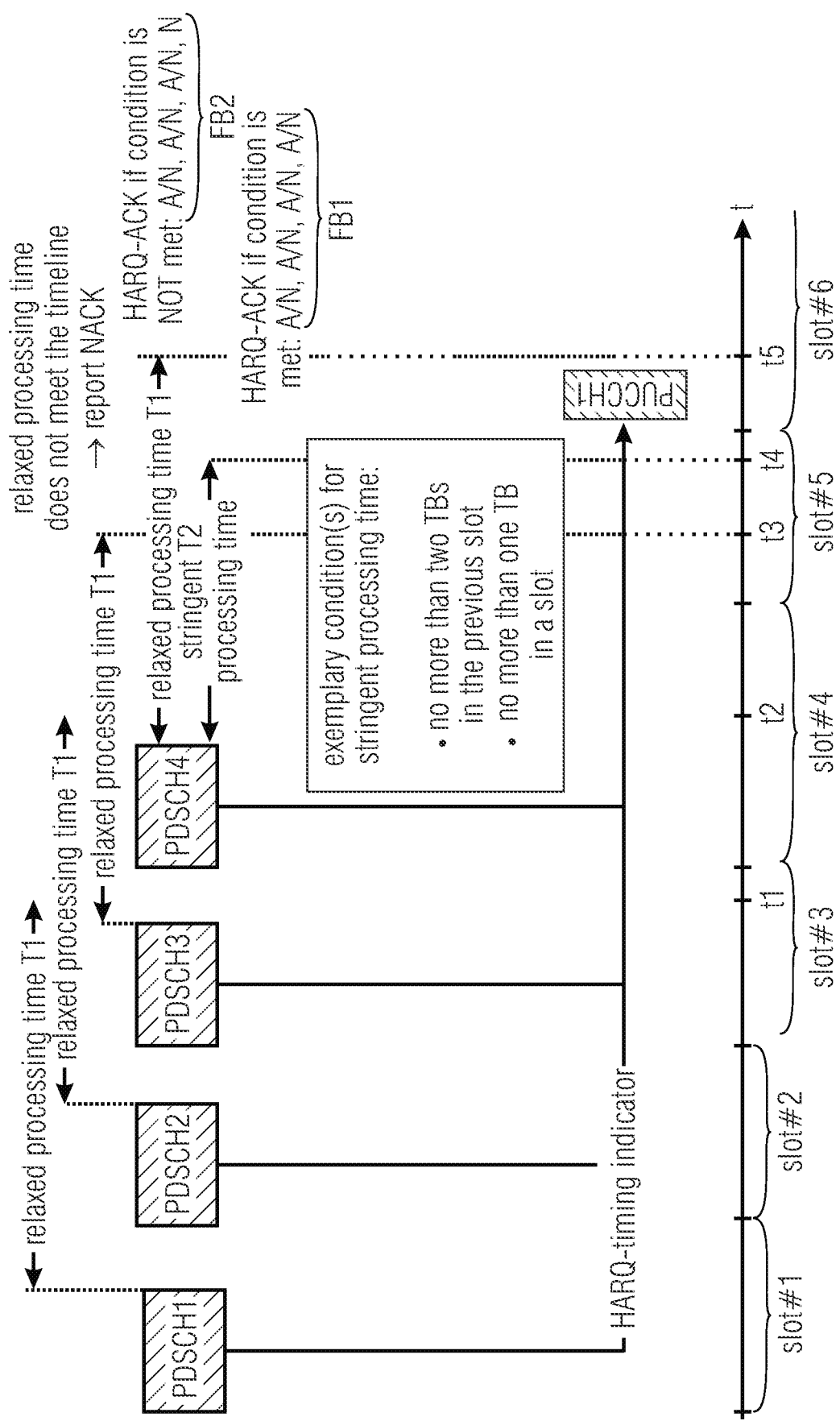
FIG. 6 illustrates an embodiment of a dynamic switching of processing times in a HARQ-scenario.

In accordance with embodiments, the inventive dynamic processing time switching may be implemented in a HARQ scenario. FIG. 6 illustrates an embodiment of the dynamic switching in a HARQ-scenario. The procedure similar to the one illustrated in FIG. 5 in that a UE, like the UE in FIG. 3, may receive respective downlink transmissions as indicated by PDSCH1, PDSCH2 PDSCH3 and PDSCH4, including a HARQ-timing indicator which indicates a PUCCH slot for an uplink transmission of an acknowledgement message, like a HARQ-ACK in the PUCCH1. This PUCCH slot, as is indicated by PUCCH1 in FIG. 6, is before the end of the relaxed processing time T1 for PDSCH4 but fulfills the more stringent processing time T2, provided the processing of the transmissions or data in PDSCH1 to PDSCH4 may be completed within the more stringent processing time T2. For example, as indicated in FIG. 6, a condition allowing to meet the more stringent processing time T2 is that not more than two transport blocks, TB, are transmitted in the previous slot, like in PDSCH3, or that not more than one TB is to be processed in the current slot, like in in PDSCH4. The UE, when such a condition applies, is capable to process the one or more TBs within the stringent processing time T2. If the processing, like the decoding of the transmission of the data, was successful, an acknowledgement, ACK, may be transmitted for the transmission in PDSCH4 already in PUCCH1 that is indicated by the HARQ-timing-indicator, i.e., ahead of the relaxed processing time T1. In case of a non-successful transmission, a non-acknowledgement, NACK, may be transmitted for the transmission in PDSCH4 in PUCCH1. Also, for the transmissions in PDSCH1, PDSCH2 and PDSCH3 an ACK or a NACK may be transmitted in PUCCH1. The feedback is indicated in FIG. 6 at FB1 as A/N, A/N, A/N, A/N-meaning that for PDSCH1 to PDSCH4 an ACK or a NACK is transmitted.

In case the UE determines that not all of the one or more criteria for switching the processing time is met, the initial or default processing time T1 is maintained, i.e., the longer, relaxed processing time, i.e., the processing of the transmission of PDSCH4 is completed only after the scheduled PUCCH1. In accordance with embodiments, in such a situation, the transmission in PDSCH4 may be considered not successful, and, while for the transmissions in PDSCH1, PDSCH2 and PDSCH3 an ACK or a NACK may be transmitted in PUCCH1, for PDSCH4 a NACK is transmitted, or the UE may drop the feedback for PDSCH4. The feedback is indicated FIG. 6 at FB2 as A/N, A/N, A/N, N-meaning that for PDSCH1 to PDSCH3 an ACK or a NACK and for PDSCH4 a NACK is transmitted. In accordance with other embodiments, when the one or more criteria are not met, the UE may not report include a HARQ feedback for PDSCH4 in PUCCH1.

In accordance with embodiments, the one or more criteria, on the basis of which the UE decides to switch between the processing times T1 and T2, may include one or more of the following:
  a dynamic indication by the gNB, e.g. in the DCI or via one or more MAC control elements, CEs,
  a number of transmissions received (in case of a dynamic switching of the PDSCH processing time) or transmitted (in the case of a dynamic switching for the PUSCH preparation time) in a certain time window before a transmission currently processed, e.g., the PDSCH4 in FIG. 5 and FIG. 6, is at or below a certain threshold, for example, a maximum of two PDSCHs/PUSCHs in a previous slot,
  a number of transmissions that the UE supports in a certain time window after the transmission currently processed, e.g., the PDSCH4 in FIG. 5 and FIG. 6, is at or below a certain threshold, for example, a maximum of two PDSCHs/PUSCHs in a next slot,
  a number of transmissions a UE supports in a current slot is at or below a certain threshold, for example, a maximum of two PDSCHs/PUSCHs in a current slot,
  a position of a HARQ feedback for one of a plurality of transmissions in a HARQ-ACK codebook, e.g. a last transmission for which HARQ feedback in a HARQ-ACK codebook is to be reported,
  a size of a current transmission and/or a previous transmission and/or a following transmission, e.g. the Transport Block Size, TBS, the Bandwidth in PRBs, the duration of the transmission, i.e. Slot Aggregation Factor, or a number of Code Block Groups, CBGs.

Figure 7A:
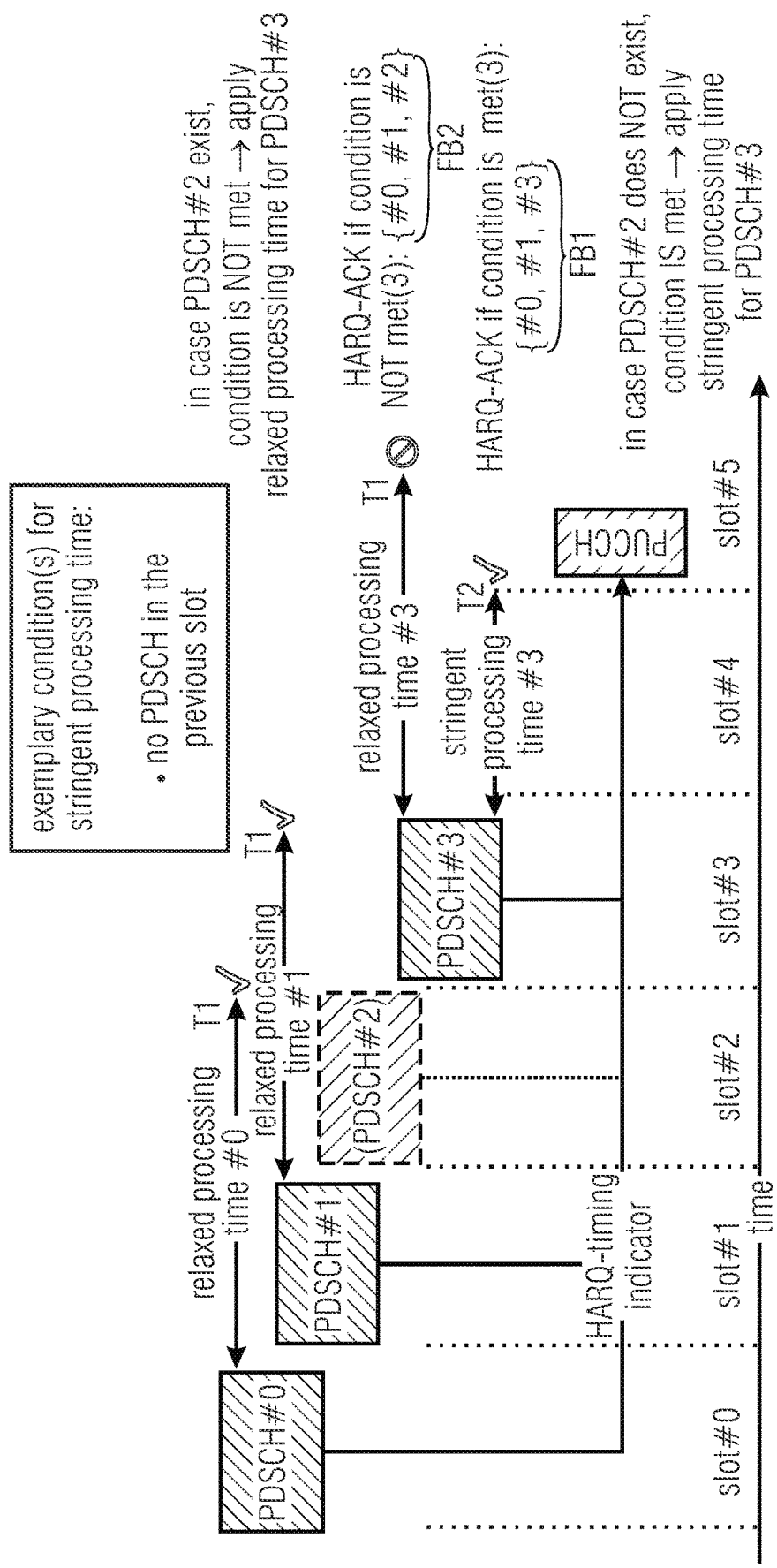
FIG. 7 (a, b and c) illustrates embodiments of different criteria to be met for allowing a UE to switch the processing time in a HARQ-scenario.
Figure 7B:
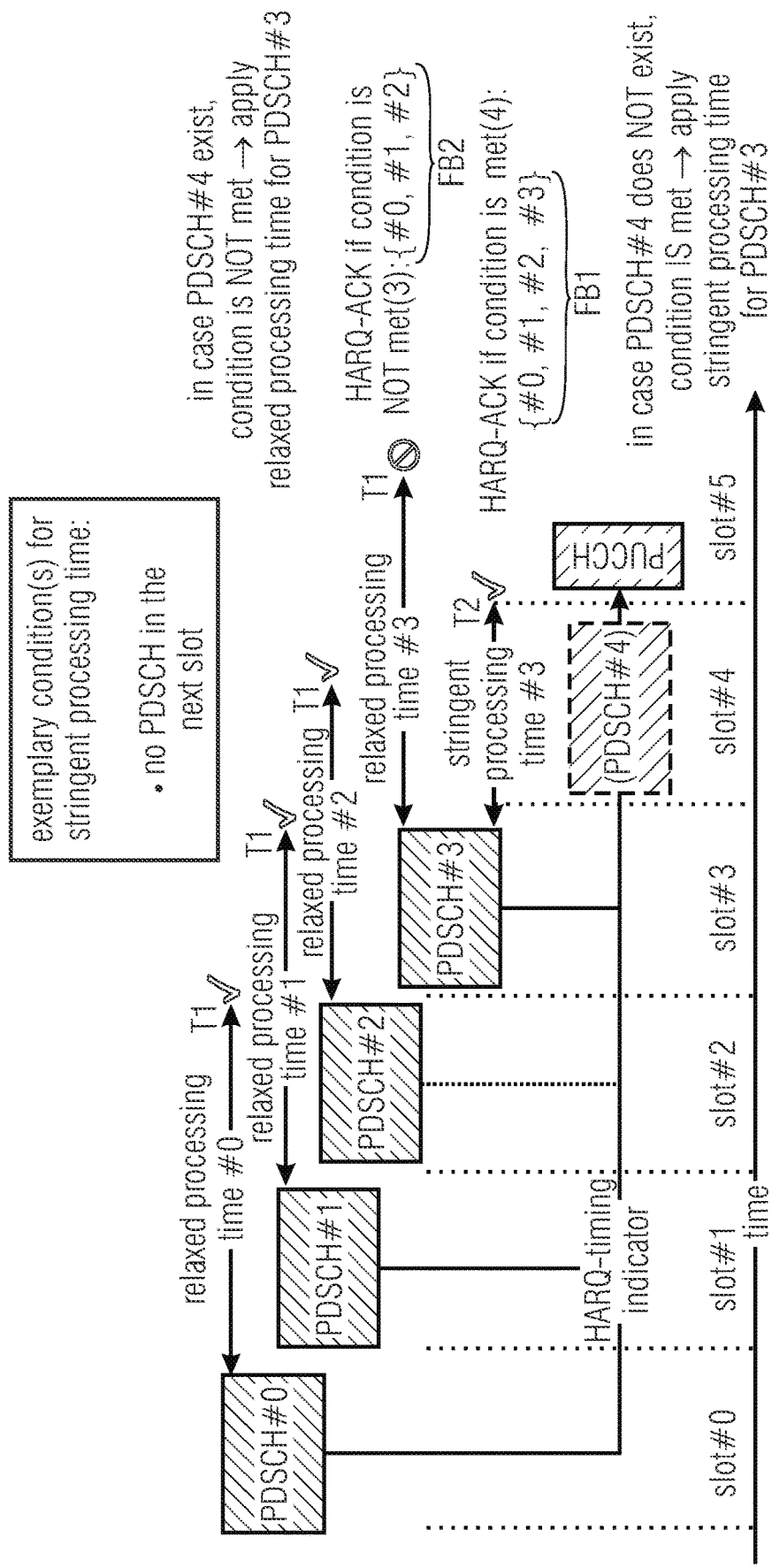
Figure 7C:
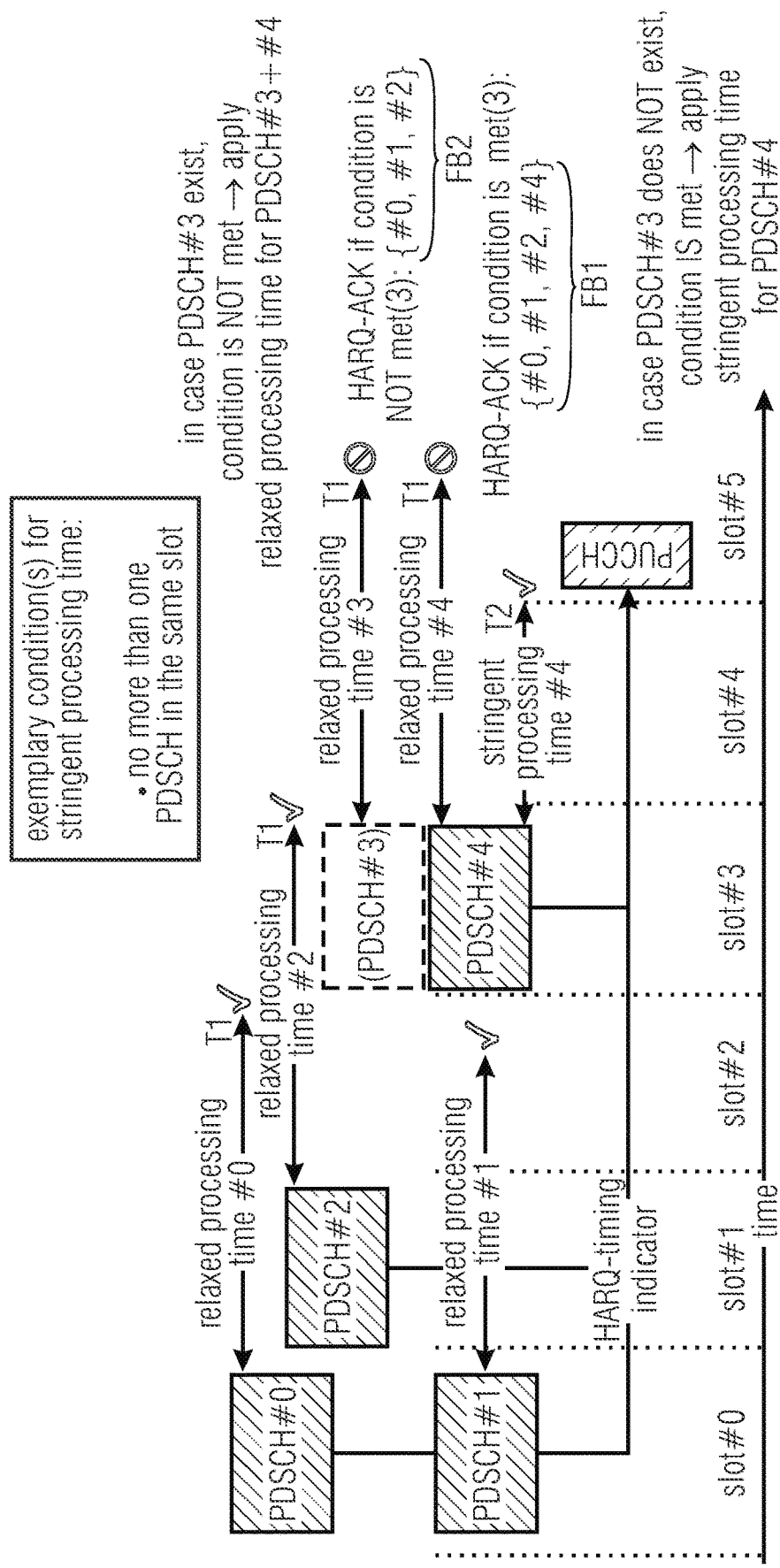

FIG. 7 illustrates embodiments of the dynamic switching in a HARQ-scenario dependent on the above-mentioned criteria.

FIG. 7 (a) describes an embodiment of the dynamic switching in a HARQ-scenario when a number of transmissions received in a certain time window before the scheduled transmission is at or below a certain threshold. A UE, like the UE in FIG. 3, may receive the downlink transmissions PDSCH #0 in slot #0, PDSCH #1 in slot #1, PDSCH #2 in slot #2 and PDSCH #3 in slot #3. A HARQ-timing indicator indicates a PUCCH in slot #5 for an uplink transmission of an HARQ-ACK. In the embodiment of FIG. 7 (a), the certain time window before the transmission PDSCH3 which is currently processed in slot #3 comprises three slots, slot #0 to slot #2, and the certain threshold is assumed to be a maximum of less than one PDSCH in each of the previous slot #0 to slot #2.

In case PDSCH #0 to PDSCH #3 exist, the condition that the number of transmissions received in each of slot #0 to slot #2 is not less than one is not met and the relaxed processing time T1 is applied. This is a situation also described above with reference to FIG. 6, and processing the transmission PDSCH #3 is completed only after the PUCCH in slot #5. Therefore, the HARQ feedback transmitted in the PUCCH incudes only the feedback for PDSCH #0 to PDSCH #2 as indicated by FB2.

On the other hand, in case only PDSCH #0, PDSCH #1 and PDSCH #3 exists, as is illustrated in FIG. 7 (a) by the PDSCH #2 being depicted in dashed lines, the condition that the number of transmissions received in each of slot #0 to slot #2 is less than one is met for slot #2 and the stringent processing time T2 is applied for PDSCH #3 in slot #3. This allows the UE to complete the processing of PDSCH #3 before the PUCCH, and the HARQ feedback is transmitted in the PUCCH for PDSCH #0 to PDSCH #3 as indicated by FB1.

FIG. 7 (b) describes an embodiment of the dynamic switching in a HARQ-scenario when a number of transmissions that the UE supports in a certain time window after the scheduled transmission is at or below a certain threshold. A UE, like the UE in FIG. 3, may receive the downlink transmissions PDSCH #0 in slot #0, PDSCH #1 in slot #1, PDSCH #2 in slot #2, PDSCH #3 in slot #3 and PDSCH #4 in slot #4. A HARQ-timing indicator indicates a PUCCH in slot #5 for an uplink transmission of an HARQ-ACK. In the embodiment of FIG. 7 (b), the certain time window after the transmission PDSCH #3 which is currently processed in slot #3 comprises one slot, slot #4, and the certain threshold is assumed to be zero PDSCHs in the next slot.

In case PDSCH #0 to PDSCH #4 exist, the condition that the number of transmissions received in the next slot is zero is not met for any one of slot #0 to slot #3 and the relaxed processing time T1 is applied for all the PDSCHs in these slots, and processing the transmission PDSCH #3 is completed only after the PUCCH in slot #5. Therefore, the HARQ feedback transmitted in the PUCCH incudes only the feedback for PDSCH #0 to PDSCH #2 as indicated by FB2.

On the other hand, in case only PDSCH #0 to PDSCH #3 exists, as is illustrated in FIG. 7 (b) by the PDSCH #4 being depicted in dashed lines, the condition that the number of transmissions received in the next slot is zero is met for slot #3 and the stringent processing time T2 is applied for PDSCH #3 in slot #3. This allows the UE to complete the processing of PDSCH #3 before the PUCCH, and the HARQ feedback is transmitted in the PUCCH for PDSCH #0 to PDSCH #3 as indicated by FB1.

FIG. 7 (c) describes an embodiment of the dynamic switching in a HARQ-scenario when a number of transmissions a UE supports in a current slot is at or below a certain threshold. A UE, like the UE in FIG. 3, may receive two or more downlink transmissions in one slot, and FIG. 7 (c) illustrates that in slot #0 two PDSCHs are received, PDSCH #0 and PDSCH #1. In slot #1 a single PDSCH, PDSCH #2 is received, and in slot #3 two PDSCHs may be received, PDSCH #3 and PDSCH #4. A HARQ-timing indicator indicates a PUCCH in slot #5 for an uplink transmission of an HARQ-ACK. In the embodiment of FIG. 7 (c), the current slot is slot #3 and the certain threshold is assumed is assumed to be a maximum of two PDSCHs that are supported in one slot.

In case PDSCH #1 to PDSCH #4 exist, the condition that the number of transmissions received in slot #3 is less than two is not met and the relaxed processing time T1 is applied, and processing the transmissions PDSCH #3 and PDSCH #4 is completed only after the PUCCH in slot #5. Therefore, the HARQ feedback transmitted in the PUCCH incudes only the feedback for PDSCH #0 to PDSCH #2 as indicated by FB2.

On the other hand, in case only PDSCH #0, PDSCH #1, PDSCH #2 and PDSCH #4 exists, as is illustrated in FIG. 7 (c) by the PDSCH #3 being depicted in dashed lines, the condition that the number of transmissions supported or processed in slot #3 is less than two is met and the stringent processing time T2 is applied. This allows the UE to complete the processing of PDSCH #4 before the PUCCH, and the HARQ feedback is transmitted in the PUCCH for PDSCH #0, PDSCH #1 PDSCH #2 and PDSCH #4 as indicated by FB1.

In accordance with other embodiments the dynamic switching in a HARQ-scenario may occur dependent on certain position of a HARQ feedback for one of a plurality of transmissions in a HARQ-ACK codebook. In the embodiment described above with reference to FIG. 6 the HARQ-ACK feedback indicates that the feedback FB1 or FB2 for the transmissions or receptions PDSCH1 to PDSCH4 are transmitted in PUCCH1. For example, the UE may switch to the stringent processing time T2 for processing the transmission PDSCH4, the last transmission for which HARQ feedback in the HARQ-ACK codebook is to be reported in PUCCH1.

In accordance with yet other embodiments the dynamic switching in a HARQ-scenario may occur dependent on a size of one or more of a current transmission, a previous transmission, a following transmission. The size may be the Transport Block Size, TBS, the Bandwidth in PRBs, the duration of the transmission, e.g., a Slot Aggregation Factor or number of OFDM symbols within a slot, or a number of resource elements, RE, or a number of Code Block Groups, CBGs. When the size of a transmission is less than a certain threshold this means that the processing takes less time for the because of multiple reasons. First, the reception may be completed earlier than for a longer transmission and the UE may start the processing earlier and complete the processing, e.g., before a next transmission is received. Second, the processing steps, e.g. demodulation or decoding, may finish earlier for smaller transmissions since a lesser number of computational steps are entailed.

Figure 8:
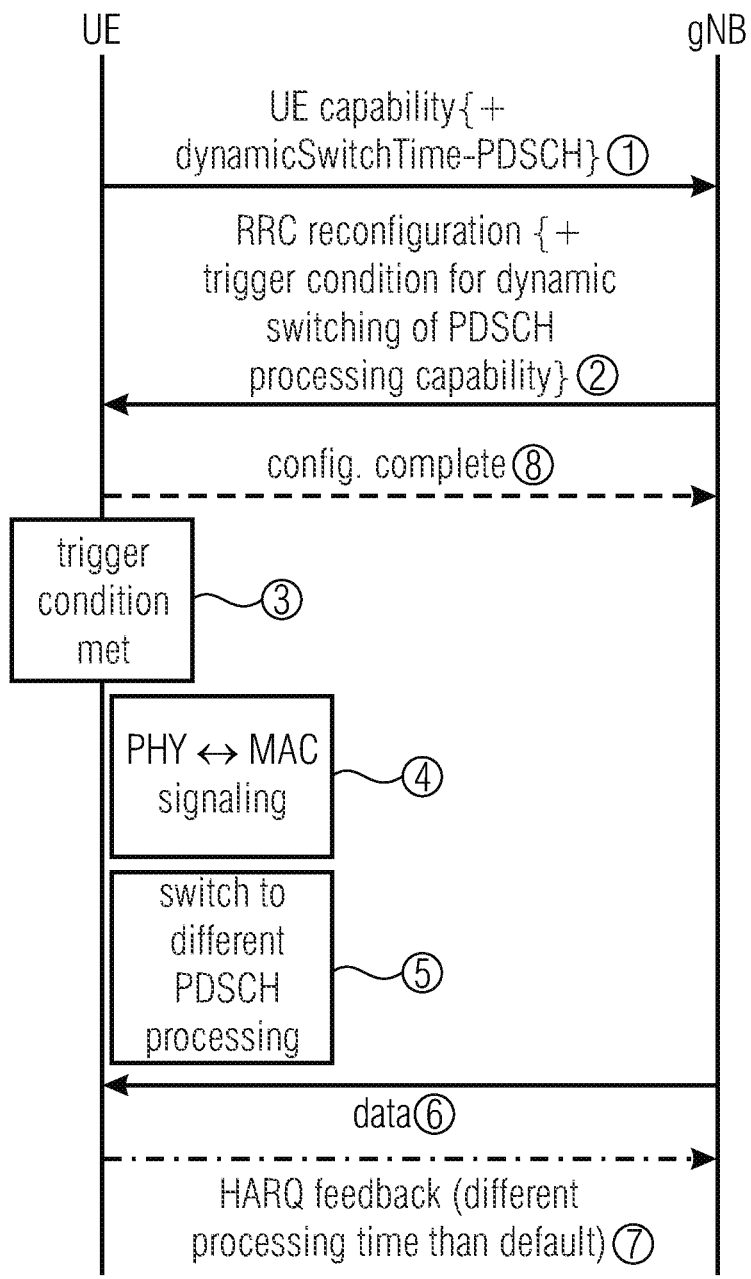
FIG. 8 illustrates an embodiment of s signaling procedure for configuring a dynamic switching of processing times at a UE by the network.

The processing times and the criteria mentioned above, in accordance with embodiments, may be preconfigured or configured by the network or the UE. FIG. 8 illustrates an embodiment in which the UE is preconfigured by the network to switch to a different PDSCH processing time. The UE, initially signals ⓐ its capability of switching the processing times. For example, the UE may signal this when connecting or reconnecting to the network via the gNB. An example of a UE capability IE syntax for dynamic PDSCH processing time may be as follows:

| Phy-ParametersCommon ::= | SEQUENCE { |
|---|---|
| dynamicSwitchTime-PDSCH | ENUMERATED {supported} OPTIONAL, |

The gNB, may configure ② the UE with the dynamic processing time switching, e.g., the processing time switching functionality may be activated by the gNB, e.g., using an RRC reconfiguration message. The one or more criteria to be met for a switching to one of two or more processing times are also included in the message. One of the processing times may be considered the default time, for which no constraints apply, and the gNB includes the one or more criteria to be met for allowing a switching to the second, shorter processing time or, in accordance with other embodiments, to one of a plurality of shorter processing times selected dependent on certain criteria associated with the respective different shorter processing times. In accordance with embodiments, the network does not configure the UE with a more relaxed criteria than a default criteria that may be signaled by the UE.

In accordance with embodiments, when configuring the UE by the network, the gNB may signal at ② one, some or all of the available criteria associated with one or more of the possible processing times that may be employed by the UE.

In accordance with other embodiments, the UE may be preconfigured with a processing-switching-time-configuration defining the processing times and the one or more criteria. For example, the processing-switching-time-configuration may be defined in a standard, and the gNB is also aware of the processing-switching-time-configuration so that responsive to signaling ①, the gNB may send the RRC reconfiguration message ② or, in accordance with other embodiments, a DCI message, for activating the switching at the UE.

In accordance with other embodiments, in case of a preconfigured UE, having a plurality of criteria that may allow switching the processing times, the gNB may not only activate the switching functionality at the UE but also select one, some or all of the criteria the UE is to monitor so as to initiate the switching to the shorter processing time when the one, some or all of the signal criteria in the message 2 are fulfilled.

In the embodiment depicted in FIG. 8, once the switching of processing times is activated in a way as described above, and in case a criterium or trigger condition is met, namely the trigger condition for causing the switching of the processing times, as indicated at 3, at the UE there may be a signaling 4 between the physical layer, PHY, and the MAC layer so as to cause at the switching 5 to the different PDSCH processing time, as described above with reference to FIG. 5 and FIG. 6. For example, when the physical layer receives a packet for which it is indicated that a shorter or a shortest processing time may be used, the physical layer indicates the more stringent processing to the MAC layer so that the MAC layer may prioritize the packet and return the result in form a HARQ feedback earlier to the physical layer. In accordance with other embodiments, the criteria for a faster processing may be known at the MAC layer, so that the MAC layer may determine when the criteria are met so that the physical layer does not need to signal a more stringent processing to the MAC layer. The present invention is not limited to the signaling from the PHY layer to the MAC layer. In accordance with other embodiments, the signaling may also be from the PHY layer to another higher layer, e.g. the MAC layer.

The data received ⑥ from the gNB is then processed in accordance with the switched processing time, and a HARQ-feedback may be returned ⑦ to the gNB as described above with reference to FIG. 6.

In accordance with further embodiments, the UE may acknowledge receipt of the configuration the message ② by sending ⑧ a corresponding message, like a RRC_Reconfiguration_Complete message.

In accordance with further embodiments, the gNB may transmit further reconfiguration messages, either via RRC or MAC CE or DCI, so as to modify the initially or currently defined or valid processing-switching-time-configuration indicating processing times and/or criteria for switching among the processing times. For example, in case the gNB determines that certain requirements regarding the communication with the UE change, like varying latency requirements, or the gNB using the feedback for the last transmission to be included into the PUCCH, e.g., because there is no following PUCCH available, the UE or the gNB may decide to increase or decrease the number of possible processing times among which the UE may switch, in case more than two processing times are configured at the UE, and/or for the switching to the one or more different processing times, the UE or the gNB may change the criteria, i.e., one or more currently used criteria may be replaced by other criteria, a number of criteria to be met may be increased or decreased, or a certain processing time may no longer be supported. In either case, the gNB or the UE may signal the modification.

In accordance with embodiments, after switching to the new processing time, the UE may continue to use this processing time as long as the one or more criteria are fulfilled, i.e., switching back to the initial or default processing time may be performed once the one or more criteria for employing the current processing time are no longer met. In accordance with embodiments, in case of using more than two possible processing times to which the UE may switch, switching back from a current processing time may also include, instead of switching back to the default processing time, switching back to a processing time which is longer than the currently used processing time but shorter than the default processing time.

In accordance with other embodiments, the switching back from a currently used processing time may also be responsive to a signaling from the wireless communication system, like a signaling from the gNB.

In accordance with yet other embodiments, the UE may switch back to another, longer processing time when a certain time period expires. In accordance with embodiments, the UE includes a switch back timer used to limit the number or duration of the more stringent PDSCH processing time so that no explicit signaling is required, rather, the UE goes back to the previous UE or the default processing time once the switch-back time expires.

Second Aspect—Dynamic Blind Decoding Capability

Embodiments of the second aspect of the present invention providing a dynamic blind decoding capability for a UE are now described.

Figure 9:
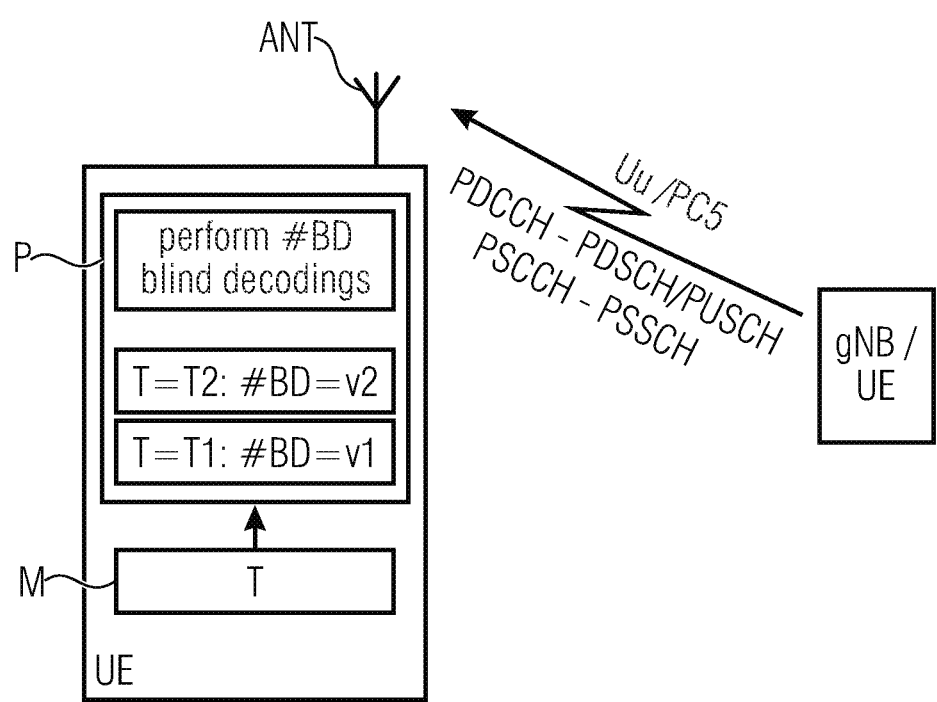
FIG. 9 schematically illustrates a user device, UE, which, in accordance with embodiments of the second aspect of the present invention, maps a number of blind decodings to be performed by a UE and a minimum time between a control message and a corresponding data channel.

FIG. 9 schematically illustrates a user device, UE, which, in accordance with embodiments of the second aspect of the present invention, maps a number of blind decodings to be performed by a UE and a minimum time between a control message and a corresponding data channel. The UE includes an antenna ANT to receive transmissions from a transmitter, like a gNB, for example, via the Uu interface, or from another UE over a sidelink, for example, using the PC5 interface. The UE comprises a processor P to process the transmissions received and to perform blind decoding in a certain search space, for example, indicated in a DCI or SCI, to find control data. The UE further includes a storage M holding a minimum time T, for example, K0min or K2 min, and the processor P receives from the memory M the minimum time stored. In case the minimum time T is a first time T1, like K0min, a number of blind decodings (#BDs) to be performed by the UE is set to a first value (v1), and in case the minimum time T stored in a memory M is a second time T2, like K2 min, the processor P sets a number of blind decodings (#BDs) to be performed to a second value (v2), the second value being lower than the first value. The minimum time T stored in the memory indicates a time between a control message, like a DCI or a SCI, and a corresponding data channel, like the PDSCH or the PUSCH in case a transmission on the Uu interface, or the PSSCH in case a transmission on the sidelink.

To address the above-described drawbacks with a reduced blind decoding effort for UEs, for example, low-complexity UEs, in accordance with embodiments, a mapping between a number of blind decodings to be performed by the UE and a minimum time T between a control message and a corresponding data channel is introduced. For example, the minimum time T may be the above-mentioned time K0min or K2 min between a DCI and a PDSCH and a PUSCH, respectively. In accordance with embodiments, a mapping between the K2 min and K0min times and the BD capability of the UE is introduced. In accordance with embodiments, the UE sets the number of blind decodings (#BDs) to be performed dependent on the minimum time T, which may be signaled by the gNB. For example, in case the UE receives a first value T1 for the minimum time, like K2 min, a first number v1 of BDs per slot may be performed, for example, a maximum number of BDs per slot. In case the UE receives a value T2 for the minimum time T that is lower than the initial value, the UE performs only a smaller number of BDs per slot which is less than the maximum number of BDs per slot. For example, for larger values the UE may be able to perform, dependent on the subcarrier spacing, 44 BDs per slot. Even in case the configured search space indicates a larger number of BDs, the UE performs only the first 44 BDs. When the gNB indicates a smaller minimum time value, like a smaller K2 min or K0min value, the UE, in view of its capabilities, determines that only a smaller number of BDs per slot may be performed, so that, for example, the number of BDs per slot may be reduced to 22. The minimum time value used at the UE may be signaled by the gNB to the UE or may be otherwise known by the gNB. Thus, based on this knowledge at the gNB, the gNB does not schedule the corresponding UE outside the first 22 PDCCH candidates, when the UE uses a shorter minimum time T. Although this may reduce the scheduling flexibility within a CORESET, it has the advantage that it allows the gNB to schedule the UE faster.

In the above embodiments, a situation has been described in which the gNB signals to the UE a first minimum time value and a second minimum time value, the second minimum time value being lower than the first minimum time value, however, the present invention is not limited to such embodiments, rather the gNB may select a minimum time value to be signaled to the UE from two or more available minimum time values so that the UE may set the number of blind decodings not only to a first value in accordance with the first minimum time, like 44 BDs and to a second value for the second minimum time value, like 22 BDs, but also to BDs between the two values or below the second value.

Figure 10:
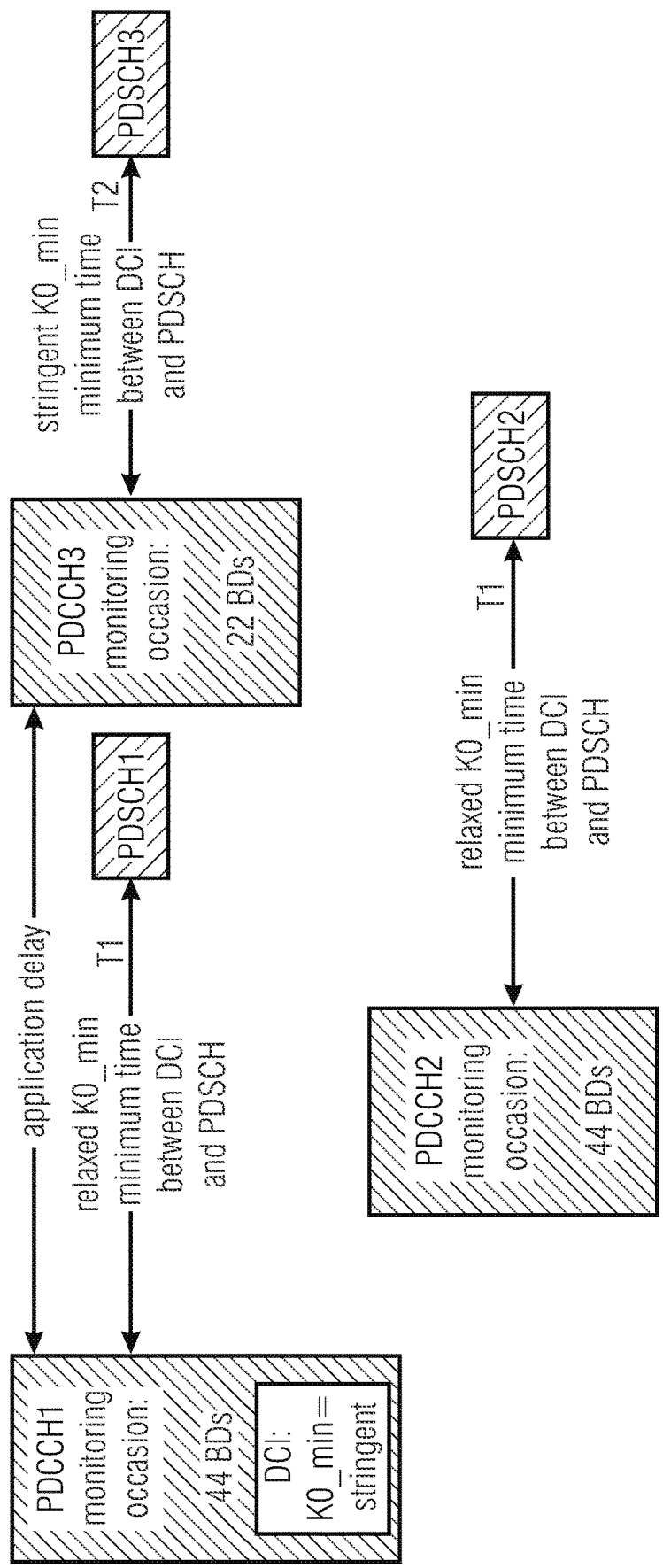
FIG. 10 illustrates an embodiment of changing a number of blind decodings dependent on a minimum time between a control message and a corresponding data channel.

FIG. 10 illustrates an embodiment of changing a number of blind decodings dependent on a minimum time between a control message and a corresponding data channel. It is assumed that a UE is initially operating with a relaxed K0min value, i.e., a minimum time allowing to perform, for example, 44 BDs. In the first PDCCH monitoring occasion PDCCH1, the UE receives from the gNB a more stringent, i.e., shorter K0min, for example, in a DCI. After a certain application delay, in a PDCCH monitoring occasion PDCCH3 a lower number of BDs, for example, 22 BDs are performed. FIG. 10 illustrates three PDCCH monitoring occasions PDCCH1, PDCCH2 and PDCCH3 and the associated data channels PDSCH1, PDSCH2 and PDSCH3. The minimum time between the PDCCH and the PDSCH is indicated either as T1 in case of the longer minimum time value or as T2 in case of the shorter minimum time value indicated as a relaxed K0min minimum time and a stringent K0min minimum time, respectively. As mentioned above, it is assumed that at PDCCH1 a DCI is received indicating the stringent time T2 to be used whereas no such DCI is received at PDCCH2. Thus, the relaxed minimum time T1 allows the UE to perform between receiving the DCI and the corresponding PDSCH the 44 BDs, while after changing to the more the stringent minimum time T2, between the DCI and the PDSCH only 22 BDs are performed in view of the capabilities, like the processing capabilities, of the UE.

In accordance with embodiments, the UE determines a maximum number of blind decodings the UE is capable to perform.

In accordance with embodiments, the UE is preconfigured with a mapping between the minimum time and the number of blind decodings, or, responsive to signaling its capability to the wireless communication system, the UE is configured with the mapping, e.g., by receiving from the wireless communication system a configuration indicating the mapping between the minimum time and the number of blind decodings.

In accordance with embodiments, one or more optional search spaces or CORESETs may be provided. An optional search space and/or CORESET may be activated/deactivated responsive to the indication of the parameter indicating the minimum time, like the K2 min and/or the K0min parameter. For example, in a search space of CORESET configuration, the search space may be marked as optional or may be linked to a certain set of constraints including a certain value for the minimum time, so that the additional search space is only available if the constraints are met. For example, in case the minimum time value is selected to be larger than a certain threshold value, the additional search space may be made available, for example, by setting a flag in the CORESET configuration that is transmitted to the UE. The UE, in case the received value for the minimum time from the gNB is above the threshold performs the higher number of blind decodings not only in the search space so far defined but also in the additional search space indicated, for example, by the CORESET configuration.

In accordance with embodiments the UE may receive, e.g., using an RRC signaling in response to signaling its UE capability to the wireless communication system, a search space configuration indicating for different values for the minimum time the certain search space and/or the additional search space.

The UE may signal its capability for a maximum number of BDs. During setup, the UE signals its BD capabilities to the network, for example, by mapping a certain number of BDs to a certain minimum K0/K2 min value. The network either implicitly takes these values by confirming the message or assigns explicitly a certain mapping to the UE. An example of a possible UE Capability IE syntax is as follows:

```
Phy-ParametersCommon ::=                         SEQUENCE {
    ...
    maximum-PDCCH-BlindDetection-Capability      SEQUENCE(SIZE (1..3)) OF
    maximum-PDCCH-BlindDetection-Configuration
}
maximum-PDCCH-BlindDetection-Configuration ::= SEQUENCE {
    maximum-PDCCH-BlindDETECTION                 INTEGER (1..15),
    minimum-K0-K2-min-value                      INTEGER (1..15)
}
```

Embodiments of the second aspect of the present invention are advantageous as they allow adapting the number of blind decodings to be performed by a UE to the signaled minimum time between the control message and the data channel associated therewith, and since the minimum time is known at the gNB, e.g. because it is signaled by the gNB to the UE, the gNB is aware of the number of blind decodings the UE performs, for example a higher number or a lower number dependent on the signaled minimum time value, so that the UE may schedule the respective PDCCH candidates accordingly, i.e., schedule the UE only to the PDCCH candidates the UE is capable to decode.

Figure 11:
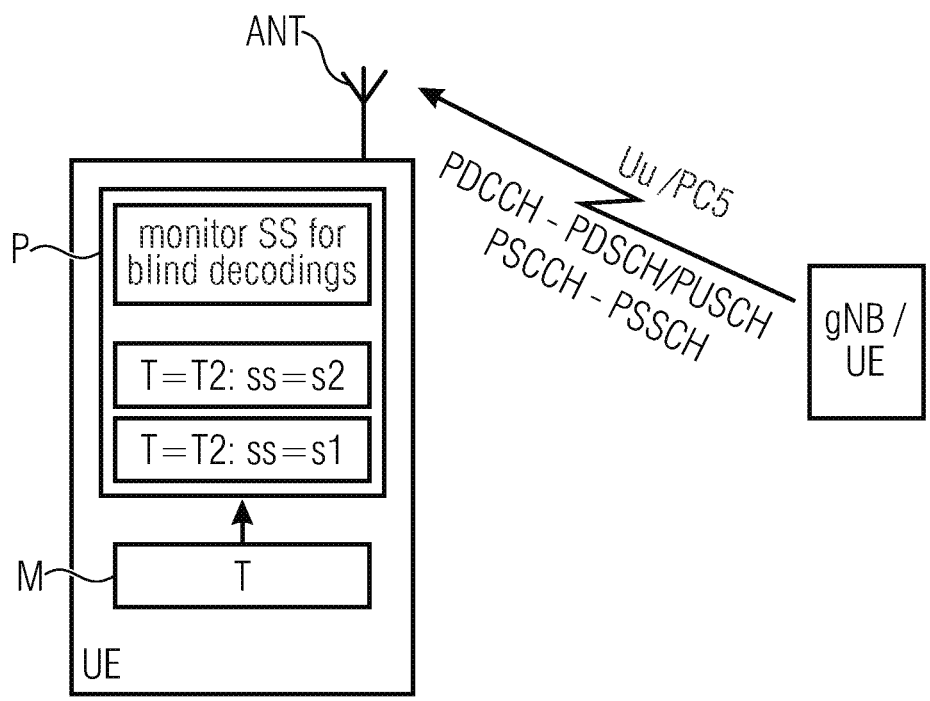
FIG. 11 schematically illustrates a user device, UE, which, in accordance with further embodiments of the second aspect of the present invention, maps a set of search spaces to be monitored by a UE and a minimum time between a control message and a corresponding data channel.

FIG. 11 schematically illustrates a user device, UE, which, in accordance with further embodiments of the second aspect of the present invention, maps a set of search spaces to be monitored by a UE and a minimum time between a control message and a corresponding data channel. The UE includes an antenna ANT to receive transmissions from a transmitter, like a gNB, for example, via the Uu interface, or from another UE over a sidelink, for example, using the PC5 interface. The UE comprises a processor P to process the transmissions received and to perform blind decodings to find control data. The UE further includes a storage M holding a minimum time T, for example, K0min or K2 min, and the processor P receives from the memory M the minimum time stored. In case the minimum time T is a first time T1, like K0min, the UE monitors a first set (s1) of search spaces, and in case the minimum time T stored in a memory M is a second time T2 which is larger than T1, like K2 min, the UE monitors a second set (s2) of search spaces, the first and second sets being different in the number of blind decodes. The first set having a smaller number of blind decodes.

In accordance with embodiments, the UE is preconfigured with a mapping between the minimum time and the set of search spaces, or, responsive to signaling its capability to the wireless communication system, the UE is configured with the mapping, e.g., by receiving from the wireless communication system a configuration indicating the mapping between the minimum time and the set of search spaces.

In accordance with embodiments, the UE receives, e.g., using an RRC signaling in response to signaling the UE capability to the wireless communication system, a plurality of search space configurations, the plurality of search space configurations indicating for different values for the minimum time the set of search spaces to be monitored by the UE.

In accordance with embodiments, an existing RRC PDCCH-Config IE may be used for signaling the search spaces, e.g., to add or modify UE-specific search spaces.

```
PDCCH-Config ::=                SEQUENCE {
...
    searchSpacesToAddModList    SEQUENCE(SIZE (1..10)) OF SearchSpace
    searchSpacesToReleaseList   SEQUENCE(SIZE (1..10)) OF SearchSpaceId
}
```

Below is the example of an RRC signaling configuration using the SearchSpace IE, which may be used to configure the optional search spaces. They may now have a different number of maximum blind decodings, depending also on the value of a parameter minimumK0min_K2_min. The parameter minimumK0min_K2_min indicates the minimum value for the time between control and data, i.e. K0min and/or K2 min, for which this search space is applicable. All other parameters in the example below are existing parameters.

```
SearchSpace ::=                              SEQUENCE {
    searchSpaceId                            SearchSpaceId,
    controlResourceSetId                     ,
    monitoringSlotPeriodicityAndOffset       CHOICE {
        sl1                                      NULL,
        sl2                                      INTEGER (0..1),
        sl4                                      INTEGER (0..3),
    ... }
    minimumK0min_K2_min                      INTEGER  OPTIONAL, -
search space is only applied if both K0 and K2_min fulfill condition
    monitoringSymbolsWithinSlot              BIT STRING (SIZE (14))
    nrofCandidates                           SEQUENCE {
        aggregationLevel1   ENUMERATED {n0, n1, n2, n3, n4, n5, n6, n8},
        aggregationLevel2   ENUMERATED {n0, n1, n2, n3, n4, n5, n6, n8},
    ...   aggregationLevel16  ENUMERATED {n0, n1, n2, n3, n4, n5, n6, n8}
    }
    searchSpaceType                          CHOICE {
    ...
ue-Specific                                  SEQUENCE {
        dci-Formats                          ENUMERATED {formats0-0-And-1-0, formats0-1-And-1-1},
        ...
    }
}
```

In accordance with embodiments, the change of the minimum time value is effective only after a certain, well-defined application delay so that even if the gNB indicates a different minimum time value, like a different K0min and/or K2 min value, the associated change may take a while to consider the changed operation mode.

Figure 12:
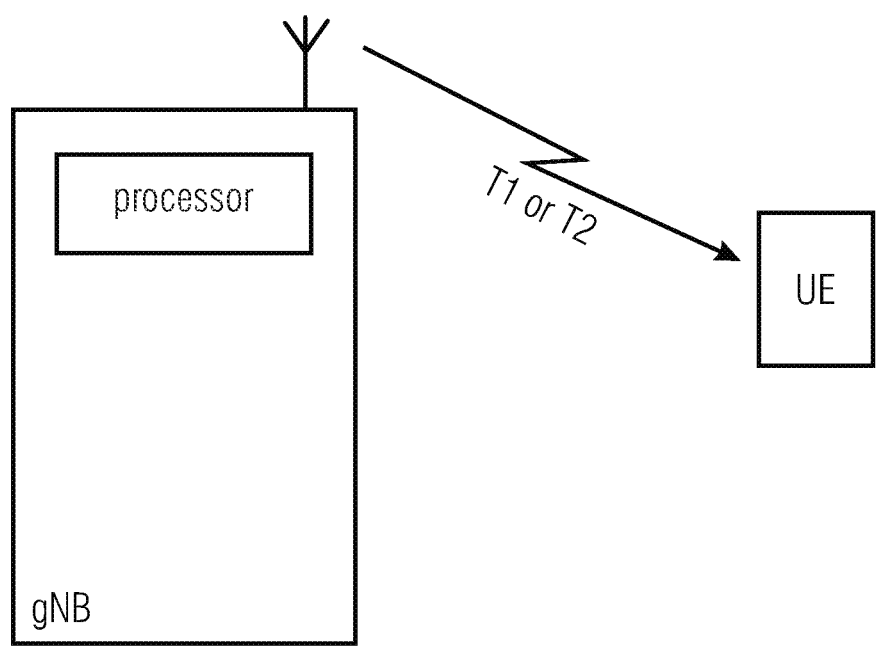
FIG. 12 schematically illustrates a base station, like a gNB, in accordance with embodiments of the second aspect of the present invention.

FIG. 12 schematically illustrates a base station, like a gNB, in accordance with embodiments of the second aspect of the present invention. The gNB is to serve one or more UEs, of which one or more may be a UE operating in accordance with the second aspect of the present invention, for example, a UE as explained above with reference to FIG. 9 or FIG. 11. The gNB is to select a minimum time and to send the minimum time to the UE so as to allow the UE to determine the number of blind decodings to be performed or the set of search space to be monitored.

General

Embodiments of the present invention have been described in detail above, and the respective embodiments and aspects may be implemented individually or two or more of the embodiments or aspects may be implemented in combination.

With regard to the above-described embodiments of the various aspects of the present invention, it is noted that they have been described in a certain environment in which a communication is between a user device, like a UE, and a base station, like a gNB. However, the invention is not limited to such a communication, rather, the above-described principles may equally be applied also for a device-to-device communication over the sidelink, like a D2D, V2V or V2X communication.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the user device, UE, may be one or more of a mobile terminal, or a stationary terminal, or a cellular IoT-UE, or a vehicular UE, or a vehicular group leader (GL) UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity. The base station, BS, may be implemented as mobile or immobile base station and may be one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or a WiFi AP STA, e.g., 802.11ax or 802.11be, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 13 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A user device for a wireless communication system, wherein the user device is to process a transmission received at the user device or to be prepared by the user device within a first processing time,
wherein, responsive to one or more criteria, the user device is to switch from the first processing time to a second processing time to be used to process a transmission received at the user device or to be transmitted from the user device,
wherein the one or more criteria comprise one or more of the following:
a number of transmissions received or to be transmitted in a certain time window before a scheduled transmission, wherein the number of transmissions received or to be transmitted in a certain time window before a scheduled transmission comprises maximum two Physical Downlink Shared Channels, PDSCHs, or Physical Uplink Shared Channels, PUSCHs, in a previous slot,
a number of transmissions that the user device supports in a certain time window after a scheduled transmission, wherein the number of transmissions that the user device supports in a certain time window after a scheduled transmission comprises maximum two PDSCHs or PUSCHs in the next slot,
a number of transmissions the user device supports in a current slot, wherein the number of transmissions the user device supports in a current slot comprises maximum two PDSCHs or PUSCHs in the current slot,
a position of a Hybrid Automatic Repeat-reQuest, HARQ, feedback for one of a plurality of transmissions in a AHRQ-Acknowledgement, HARQ-ACK, codebook, wherein the position of the HARQ feedback for one of a plurality of transmissions in a HARQ-ACK codebook comprises a last transmission for which a HARQ feedback in a HARQ-ACK codebook is to be reported,
a size of one or more of the following: a current transmission, a previous transmission, a following transmission, wherein the size of a current transmission, the previous transmission or following transmission comprises a Transport Block Size, TBS, a Bandwidth in Physical Resource Blocks, PRBs, a duration of the transmission, or a number of Code Block Groups, CBGs.

2. The user device, UE, of claim 1, wherein
the first processing time comprises a first duration, and the second processing time comprises a second duration, and
the first duration is shorter than the second duration, or the first duration is longer than the second duration.

3. The user device of claim 1, wherein
the user device is preconfigured with the one or more criteria and the first and second processing times, and
the user device is to signal its capability to switch processing times to the wireless communication system when connecting or reconnecting to the wireless communication system.

4. The user device of claim 3, wherein the user device is to receive from the wireless communication system a signaling that indicates which of the preconfigured criteria and/or processing times are to be used by the user device.

5. The user device of claim 1, wherein
the user device is to signal its capability to switch processing times to the wireless communication system when connecting or reconnecting to the wireless communication system, and
the user device is to receive from the wireless communication system a configuration comprising the one or more criteria and/or the first and second processing times.

6. The user device, UE, of claim 1, wherein the user device is to activate the processing time switching responsive to a signaling from the wireless communication system.

7. The user device of claim 1, wherein, after switching to the second processing time, the user device is to stop using the second processing time by switching back to the first processing time responsive to
the one or more criteria being no longer met, or
a signaling from the wireless communication system, or
expiry of a certain time period.

8. The user device of claim 7, wherein the user device comprises a switch-back timer, and wherein the user device is to start the switch-back timer when switching to the second processing time and to return to the first processing time after the switch-back timer expired.

9. The user device of claim 1, wherein
in case the one or more criteria are not known at a higher layer, the higher layer of the user device is to receive from the PHY layer of the user device an indication of the second processing time and to process a packet received from the PHY layer of the user device in accordance with the indicated second processing time, or
in case the one or more criteria are known at the higher layer, the higher layer of the user device is to determine whether the one or more criteria are met, and to process a packet received from the PHY layer of the user device in accordance with the second processing time when the one or more criteria are met.

10. The user device of claim 1, wherein, dependent on the one or more criteria, the user device is to select the second processing time from a plurality of processing times the user device is capable to use.

11. The user device of claim 1, wherein the user device is a low-complexity device.

12. A base station for a wireless communication system, wherein the base station is to serve a user device of the wireless communication system, the user device capable to switch from a first processing time to a second processing time to be used to process a transmission received at the user device or to be transmitted from the user device, and wherein the base station is to send to the user device a signaling that causes the user device to activate the processing time switching, and
wherein the base station is to send the user device a signaling that causes the user device to activate the processing time switching, and
wherein the one or more criteria comprise one or more of the following:
a number of transmissions received or to be transmitted in a certain time window before a scheduled transmission, wherein the number of transmissions received or to be transmitted in a certain time window before a scheduled transmission comprises maximum two Physical Downlink Shared Channels, PDSCHs, or Physical Uplink Shared Channels, PUSCHs, in a previous slot,
a number of transmissions that the user device supports in a certain time window after a scheduled transmission, wherein the number of transmissions that the user device supports in a certain time window after a scheduled transmission comprises maximum two PDSCHs or PUSCHs in the next slot,
a number of transmissions the user device supports in a current slot, wherein the number of transmissions the user device supports in a current slot comprises maximum two PDSCHs or PUSCHs in the current slt,
a position of a Hybrid Automatic Repeat-reQuest, HARQ, feedback for one of a plurality of transmissions in a AHRQ-Acknowledgement, HARQ-ACK, codebook, wherein the position of the HARQ feedback for one of a plurality of transmissions in a HARQ-ACK codebook comprises a last transmission for which a HARQ feedback in a HARQ-ACK codebook is to be reported,
a size of one or more of the following: a current transmission, a previous transmission, a following transmission, wherein the size of a current transmission, the previous transmission or following transmission comprises a Transport Block Size, TBS, a Bandwidth in Physical Resource Blocks, PRBs, a duration of the transmission, or a number of Code Block Groups, CBGs.

13. The base station of claim 12, wherein the base station is to receive from the user device a signaling of its capability to switch processing times.

14. The base station of claim 12, wherein, in case the user device is preconfigured with one or more criteria for switching transmission times and/or transmission times, the base station is to send to the user device a signaling that indicates which of the preconfigured criteria and/or processing times are to be used by the user device.

15. The base station of claim 12, wherein, responsive to receiving from the user device a signaling of its capability to switch processing times, the base station is to configure the user device with one or more criteria for switching processing times and/or processing times.

16. A wireless communication system, comprising one or more user devices, UEs, wherein the user device is to process a transmission received at the user device or to be prepared by the user device within a first processing time, responsive to one or more criteria, the user device is to switch from the first processing time to a second processing time to be used to process a transmission received at the user device or to be transmitted from the user device, and
wherein the one or more criteria comprise one or more of the following:
a number of transmissions received or to be transmitted in a certain time window before a scheduled transmission, wherein the number of transmissions received or to be transmitted in a certain time window before a scheduled transmission comprises maximum two Physical Downlink Shared Channels, PDSCHs, or Physical Uplink Shared Channels, PUSCHs, in a previous slot,
a number of transmissions that the user device supports in a certain time window after a scheduled transmission, wherein the number of transmissions that the user device supports in a certain time window after a scheduled transmission comprises maximum two PDSCHs or PUSCHs in the next slot,
a number of transmissions the user device supports in a current slot, wherein the number of transmissions the user device supports in a current slot comprises maximum two PDSCHs or PUSCHs in the current slot,
a position of a Hybrid Automatic Repeat-reQuest, HARQ, feedback for one of a plurality of transmissions in a AHRQ-Acknowledgement, HARQ-ACK, codebook, wherein the position of the HARQ feedback for one of a plurality of transmissions in a HARQ-ACK codebook comprises a last transmission for which a HARQ feedback in a HARQ-ACK codebook is to be reported,
a size of one or more of the following: a current transmission, a previous transmission, a following transmission, wherein the size of a current transmission, the previous transmission or following transmission comprises a Transport Block Size, TBS, a Bandwidth in Physical Resource Blocks, PRBs, a duration of the transmission, or a number of Code Block Groups, CBGs.

17. A method for operating a wireless communication system, the wireless communication system comprising one or more user devices, UEs, the method comprising: processing, by a user device, a transmission received at the user device or to be prepared by the user device within a first processing time, and responsive to one or more criteria, switching, by the user device, from the first processing time to a second processing time to be used to process a transmission received at the user device or to be transmitted from the user device, and wherein the one or more criteria comprise one or more of the following:
- a number of transmissions received or to be transmitted in a certain time window before a scheduled transmission, wherein the number of transmissions received or to be transmitted in a certain time window before a scheduled transmission comprises maximum two Physical Downlink Shared Channels, PDSCHs, or Physical Uplink Shared Channels, PUSCHs, in a previous slot,
- a number of transmissions that the user device supports in a certain time window after a scheduled transmission, wherein the number of transmissions that the user device supports in a certain time window after a scheduled transmission comprises maximum two PDSCHs or PUSCHs in the next slot,
- a number of transmissions the user device supports in a current slot, wherein the number of transmissions the user device supports in a current slot comprises maximum two PDSCHs or PUSCHs in the current slot,
- a position of a Hybrid Automatic Repeat-reQuest, HARQ, feedback for one of a plurality of transmissions in a AHRQ-Acknowledgement, HARQ-ACK, codebook, wherein the position of the HARQ feedback for one of a plurality of transmissions in a HARQ-ACK codebook comprises a last transmission for which a HARQ feedback in a HARQ-ACK codebook is to be reporte,
- a size of one or more of the following: a current transmission, a previous transmission, a following transmission, wherein the size of a current transmission, the previous transmission or following transmission comprises a Transport Block Size, TBS, a Bandwidth in Physical Resource Blocks, PRBs, a duration of the transmission, or a number of Code Block Groups, CBGs.

18. The method of claim 17, comprising:

serving, by a base station, the user device being capable to switch from the first processing time to the second processing time to be used to process a transmission received at the user device or to be transmitted from the user device, and sending to the user device, by the base station, a signaling that causes the user device to activate the processing time switching.

* * * * *